(12) United States Patent
Breen et al.

(10) Patent No.: US 8,550,234 B2
(45) Date of Patent: Oct. 8, 2013

(54) SEQUENTIAL CONTROLLED START-UP FOR ZONED CONVEYOR SYSTEMS

(75) Inventors: Derrick A. Breen, Wilmington, NC (US); Kenneth M. Bolam, Fort Mill, SC (US); James A. Borgen, Cary, NC (US); John J. Kovalski, Wilmington, NC (US); Joey Randall Chriscoe, Cary, NC (US)

(73) Assignee: Interroll Corporation (CH)

( * ) Notice: Subject to any disclaimer, the term of this patent is extended or adjusted under 35 U.S.C. 154(b) by 119 days.

(21) Appl. No.: 13/313,630

(22) Filed: Dec. 7, 2011

(65) Prior Publication Data
US 2012/0175225 A1 Jul. 12, 2012

Related U.S. Application Data

(60) Provisional application No. 61/420,657, filed on Dec. 7, 2010.

(51) Int. Cl.
B65G 13/06 (2006.01)

(52) U.S. Cl.
USPC ........................................ 198/783; 198/460.1

(58) Field of Classification Search
USPC ............................. 198/781.06, 783, 784, 460.1
See application file for complete search history.

(56) References Cited

U.S. PATENT DOCUMENTS

| | | | |
|---|---|---|---|
| 2,510,163 A | 6/1950 | Wood | |
| 2,586,782 A | 2/1952 | Buckeridge | |
| 4,174,777 A | 11/1979 | Riehle | |
| 5,042,644 A | 8/1991 | Davis | |
| 5,060,785 A | 10/1991 | Garrity | |
| 5,070,995 A | 12/1991 | Schaffer et al. | |
| 5,086,910 A | 2/1992 | Terpstra | |
| 5,088,596 A | 2/1992 | Agnoff | |
| 5,089,596 A | 2/1992 | Cliffton et al. | |
| 5,228,558 A | 7/1993 | Hall | |
| 5,285,887 A | 2/1994 | Hall | |
| 5,318,167 A | 6/1994 | Bronson et al. | |
| 5,456,347 A | 10/1995 | Best et al. | |
| 5,582,286 A | 12/1996 | Kalm et al. | |
| 5,730,274 A | 3/1998 | Loomer | |
| 5,823,319 A | 10/1998 | Resnick et al. | |
| 5,862,907 A | 1/1999 | Taylor | |
| 5,918,728 A * | 7/1999 | Syverson | 198/784 |
| 6,021,888 A | 2/2000 | Itoh et al. | |
| 6,035,999 A | 3/2000 | Hall | |
| 6,244,421 B1 | 6/2001 | Hall | |
| 6,244,427 B1 | 6/2001 | Syverson | |
| 6,253,906 B1 | 7/2001 | Hall | |
| 6,302,266 B1 | 10/2001 | DeFrancisco et al. | |
| 6,612,422 B2 | 9/2003 | Roberts et al. | |
| 6,701,462 B1 | 3/2004 | Majcher et al. | |
| 6,711,427 B1 | 3/2004 | Ketelhohn | |
| 6,765,489 B1 | 7/2004 | Ketelhohn | |
| 6,820,736 B2 | 11/2004 | Itoh et al. | |
| 6,827,202 B2 | 12/2004 | Topmiller et al. | |
| 6,860,381 B2 | 3/2005 | Newson et al. | |

(Continued)

*Primary Examiner* — James R Bidwell
(74) *Attorney, Agent, or Firm* — Gerald E. Hespos; Michael J. Porco; Matthew T. Hespos

(57) ABSTRACT

The disclosure describes zoned conveyor systems with non-time based sequential power-up of different zones using defined current draw and speed threshold values and/or a defined number of motor revolutions of one conveyor zone to determine when to initiate operation of another (typically adjacent) zone.

18 Claims, 31 Drawing Sheets

(56) References Cited

U.S. PATENT DOCUMENTS

| | | |
|---|---|---|
| 7,086,524 B2 | 8/2006 | Hayashi et al. |
| 7,207,433 B2 | 4/2007 | Schaefer |
| 7,280,889 B2 | 10/2007 | Knepple et al. |
| 7,681,712 B2 * | 3/2010 | Hara et al. ............. 198/461.1 |
| 7,705,742 B1 * | 4/2010 | Delaney et al. ............ 198/460.1 |
| 8,019,469 B2 * | 9/2011 | Knepple et al. ............... 700/230 |
| 2007/0179617 A1 | 8/2007 | Brown et al. |
| 2007/0261941 A1 | 11/2007 | Pelak et al. |
| 2008/0116041 A1 | 5/2008 | Hall |

* cited by examiner

I/O BLOCK DIAGRAM

SPEED/FWD & REV CTRL

| |
|---|
| SPEED IN |
| EXTERNAL POT OUT |
| SMART1 IN |
| REVERSE IN |
| NO FAULT OUT |
| SMART1 PNP/NPN OUT |
| 24V MONITOR IN |

DOWNSTREAM PEER-TO-PEER

| |
|---|
| JOG I/O |
| REVERSE I/O |
| ACCUMULATION I/O |
| B SENSOR OUT |
| NPN IN |

DOWNSTREAM DIGITAL I/O

| |
|---|
| ** PERMISSION IN |
| ** REQUEST OUT |

PROGRAM PORT

| |
|---|
| SCK |
| MISO |
| MOSI |
| RESET |

UPSTREAM PEER-TO PEER

| |
|---|
| JOG I/O |
| REVERSE I/O |
| ACCUMULATION I/O |
| C SENSOR IN |
| NPN IN |

UPSTREAM DIGITAL I/O

| |
|---|
| **REQUEST IN |
| **PERMISSION OUT |

LEDS

| |
|---|
| FAULT LED OUT |
| FOLD BACK LED OUT |

DIP SWITCHES

| |
|---|
| SW1-LOGIC CONVENTION IN |
| SW2-MOTOR DIRECTION IN |
| SW3-SINGULATION METHOD IN |
| SW4-UPSTREAM MODE IN |
| SW5-DOWNSTREAM MODE IN |
| *SW6-MOTOR SELECT IN |
| *SW7-MOTOR SELECT IN |

SERIAL COMM.

| |
|---|
| TRANSMIT |
| RECEIVE |

BLDC MOTOR CONTROL

| |
|---|
| HIGH SIDE FET 0 OUT |
| HIGH SIDE FET 1 OUT |
| HIGH SIDE FET 2 OUT |
| LOW SIDE FET 0 OUT |
| LOW SIDE FET 1 OUT |
| LOW SIDE FET 2 OUT |
| PDM TOP OUT |
| PDM BOTTOM OUT |
| HALL EFFECT SEN 0 IN |
| HALL EFFECT SEN 1 IN |
| HALL EFFECT SEN 2 IN |
| CURRENT SENSE IN |

SENSORS

| |
|---|
| L-STOP IN |
| SENSOR 2 IN |
| SENSOR 1 IN |
| SENSOR 1 OUT |
| BOARD TEMP IN |
| *MOTOR TEMP IN |

THERE IS A 9 PIN VERSION OF THE CURRENT TYCO CONNECTOR USED FOR THE MOTOR.

ACCEL AND DECEL SWITCHES

| |
|---|
| 2 SIXTEEN POSITION ROTARY SWITCHES |
| 0x0-LOW ACCEL AND DECEL |
| 0xF - HIGH ACCEL AND DECEL |

\* NEW INPUTS TO BE ADDED FOR OPTION 2

\*\* NO LONGER BEING USED

FIG. 6 ary Application Ser. No. 61/420,657, filed Dec. 7,
SEQUENTIAL CONTROLLED START-UP FOR ZONED CONVEYOR SYSTEMS

RELATED APPLICATIONS

This application claims the benefit of and priority to U.S. Provisional Application Ser. No. 61/420,657, filed Dec. 7, 2010, the contents of which are hereby incorporated by reference as if recited in full herein.

FIELD OF THE INVENTION

This invention relates to conveyor systems.

BACKGROUND OF THE INVENTION

Zoned conveyor systems are well known. See, e.g., U.S. Pat. Nos. 5,285,887 and 5,228,558. U.S. Pat. No. 6,253,906 proposes the use of a time-based sequential release control system for zoned conveyors. The content of each of the above patents is hereby incorporated by reference as if recited in full herein. However, there remains a need for alternative ways to control zoned conveyor systems that can reduce power spikes and/or dynamic loading associated with start-up.

SUMMARY OF EMBODIMENTS OF THE INVENTION

Embodiments of the present invention are directed to zoned conveyor systems for transporting a series of loads. The systems include a series of conveyor zones including a downstream conveyor zone and a plurality of upstream conveyor zones. Each conveyor zone includes at least one drive motor for operating each respective conveyor zone to advance the loads along the conveyor system. The system also include a control circuit in communication with each at least one drive motor. The control circuit is configured to monitor during start-up for a respective conveyor zone at least one of: (i) current draw and speed of a respective drive motor as the motor goes from an unpowered state to an operational state; and/or (ii) a number of revolutions of a respective drive motor as the motor goes from an unpowered state to an operational state. The control circuit is configured, after operation of the upstream and the downstream conveyor zones is stopped to maintain stationary any loads carried by the upstream and downstream conveyor zones, to resume operation of the upstream and downstream conveyor zones by first initiating operation of the downstream conveyor zone, and subsequently sequentially controlling initiation of operation of each upstream conveyor zone. The control circuit is configured to initiate operation of one of the upstream conveyor zones based on one of the following: (i) when the drive motor of the conveyor zone downstream therefrom reaches a defined current draw and speed; or (ii) when the drive motor of the conveyor zone downstream therefrom has reached a defined number of rotations, so that operation of each conveyor zone is initiated in a controlled sequential manner in response to when the drive motor of the conveyor zone downstream therefrom reaches the defined current draw and speed or the motor has reached the defined number of revolutions.

The control circuit can be configured to increase power to a respective drive motor at a constant rate of change from the unpowered state to the operational state. The control circuit can be configured to direct the sequential operation using the monitored current draw and speed of a respective drive motor.

The drive motors can each include at least one integral Hall-effect sensor. The control circuit can be configured to direct the sequential operation based on motor revolution count using a pulse count detected by the respective Hall-effect sensors.

The control circuit can be configured to ramp up at least one of the zones at a different speed from other zones to thereby operate with improved power management and a smooth system ramp-up.

The control circuit can include a primary controller card that communicates with drive motor controller cards at upstream and downstream conveyor zones. The primary controller card can include an onboard processor that includes the sequential start-up logic and current draw and speed threshold values used to determine when to initiate start-up to the different zones.

The control circuit can be configured to operate with conveyor zones having different ratio gear boxes with each respective gear box ratio associated with a different number of rotations or current draw to raise the drive motor and associated zone up to a desired speed.

Other embodiments are directed to controller circuit devices for a zoned conveyor system. The devices include a control circuit comprising a sequential release operational mode for a zoned conveyor system having a downstream zone and a plurality of upstream conveyor zones in communication with a drive motor for each conveyor zone. The control circuit is configured to monitor current draw and speed of the respective drive motors during start-up. In the sequential release operational mode, the control circuit is configured to initiate operation of the upstream conveyor zones based on when a drive motor of the conveyor zone downstream therefrom reaches a defined current draw and speed so that operation of each conveyor zone is initiated in a controlled sequential manner in response to when the drive motor of the conveyor zone downstream thereof reaches a defined current draw and speed.

The device can be a single controller card that is configured to control start-up of different conveyor zones using different defined current draw thresholds and speeds.

The device can be configured to cooperate with conveyor zones that have different drive motors.

The device can include a motor temperature monitoring circuit that uses a predictive thermal model that considers whether a motor is associated with a zone is using dynamic braking to predict a temperature of the motor.

The device can include a motor control circuit with a plurality of low side and high side FETs in communication with at least one drive motor of at least one conveyor zone. During no-load stops the low side FETs can be automatically turned on to reduce overshoot during the no-load stops.

The device may include a look-up table of drive motors, gear ratios and associated threshold values for speed and current draw used for the sequential release mode.

The control circuit can be configured to direct a respective drive motor to ramp up to speed at a constant ramp up rate.

The control circuit can be configured to direct different conveyor zones to ramp up at different speeds while monitoring current draw.

The control circuit can be configured to direct a first upstream conveyor to initiate operation based on first current draw level, and direct a second upstream conveyor to initiate operation based on a different second current draw level.

Still other embodiments are directed to methods of operating zoned conveyor systems. The methods include: (a) stopping operation of a downstream and a plurality of upstream conveyor zones to maintain stationary any loads supported by the conveyor zones; and (b) automatically re-starting the conveyor zones by sequentially initiating operation of the downstream conveyor zone and the upstream conveyor zones by first initiating operation of the downstream conveyor zone, and subsequently sequentially controlling initiation of operation of each upstream conveyor zone. The re-starting step is carried out by: (i) monitoring current draw and speed of a drive motor associated with the downstream conveyor zone; then (ii) automatically initiating operation of an adjacent first upstream conveyor zone when the downstream drive motor reaches a predefined current level and speed; (iii) monitoring current draw and speed of a drive motor associated with the first upstream conveyor zone; then (iv) automatically initiating operation of a second upstream conveyor zone adjacent to the first upstream conveyor zone when the drive motor of the first conveyor zone reaches a predefined current draw and speed. Operation of each conveyor zone is initiated in a controlled sequential manner in response to when the drive motor of a conveyor zone downstream thereof reaches a predefined current draw and speed during start-up.

The predefined current draw and speed for at least one conveyor zone can be different from the others.

Still other embodiments are directed to other methods of operating zoned conveyor systems. These methods include: (a) stopping operation of a downstream and a plurality of upstream conveyor zones to maintain stationary any loads supported by the conveyor zones; and (b) automatically re-starting the conveyor zones by sequentially initiating operation of the downstream conveyor zone and the upstream conveyor zones by first initiating operation of the downstream conveyor zone, and subsequently sequentially controlling initiation of operation of each upstream conveyor zone. The re-starting step is carried out by: (i) counting a number of motor revolutions of a drive motor associated with the downstream conveyor zone; then (ii) automatically initiating operation of an adjacent first upstream conveyor zone when the downstream drive motor revolution count reaches a predefined level; (iii) counting a number of motor revolutions of a drive motor associated with the first upstream conveyor zone; then (iv) automatically initiating operation of a second upstream conveyor zone adjacent to the first upstream conveyor zone when the drive motor revolution count of the first conveyor zone reaches a predefined level. Operation of each conveyor zone is initiated in a controlled sequential manner in response to when the drive motor of a conveyor zone downstream thereof reaches a predefined revolution count during start-up.

It is noted that the counting of revolutions can be directly determined by counting the number of revolutions of the motor or a motor shaft or other component thereof. The counting can be carried out by counting the number of pulses associated with an optical or Hall-effect or other sensor.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner.

These and other objects and/or aspects of the present invention are explained in detail in the specification set forth below.

BRIEF DESCRIPTION OF THE DRAWINGS

FIG. 6 is a block diagram of exemplary inputs and outputs for the controller device shown in FIG. 1 and/or the zoned conveyor systems according to embodiments of the present invention.

DESCRIPTION OF EMBODIMENTS OF THE INVENTION

Figure 1:
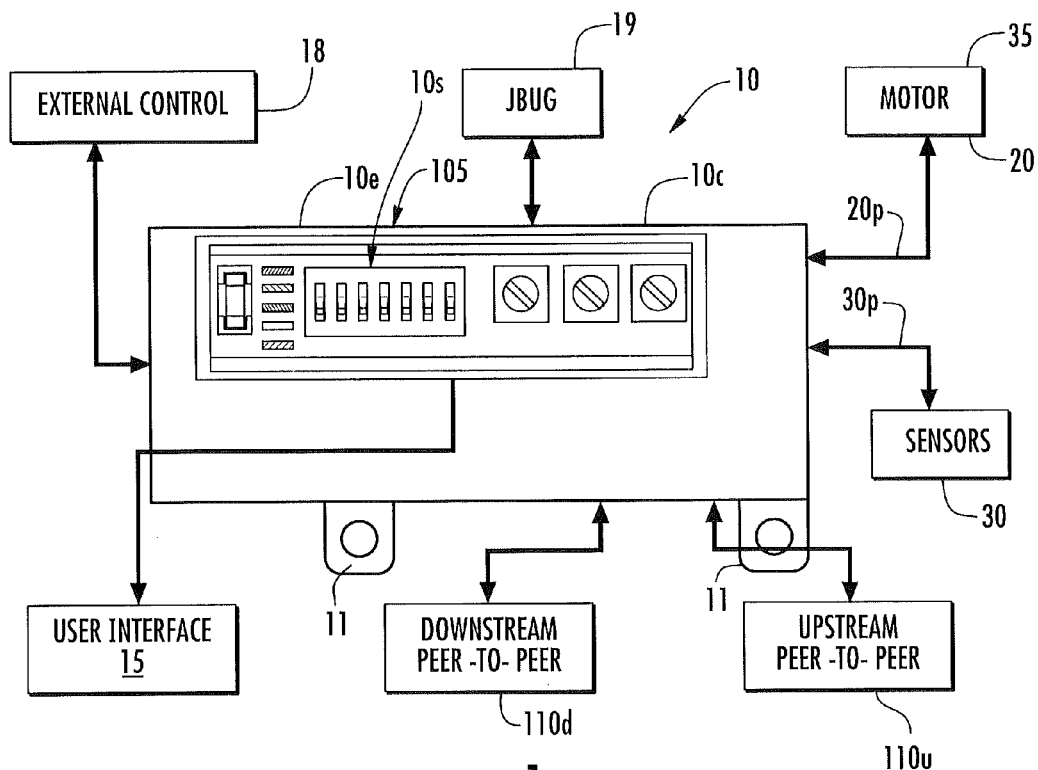
FIG. 1 is a schematic illustration of a controller device according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the figures and/or claims unless specifically indicated otherwise. In the drawings, the thickness of lines, layers, features, components and/or regions may be exaggerated for clarity and broken lines illustrate optional features or operations, unless specified otherwise.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "comprises," "comprising," "includes," and/or "including" when used in this specification, specify the presence of stated features, regions, steps, operations, elements, and/or components, but do not preclude the presence or addition of one or more other features, regions, steps, operations, elements, components, and/or groups thereof.

It will be understood that when a feature, such as a layer, region or substrate, is referred to as being "on" another feature or element, it can be directly on the other feature or element or intervening features and/or elements may also be present. In contrast, when an element is referred to as being "directly on" another feature or element, there are no intervening elements present. It will also be understood that, when a feature or element is referred to as being "connected", "attached" or "coupled" to another feature or element, it can be directly connected, attached or coupled to the other element or intervening elements may be present. In contrast, when a feature or element is referred to as being "directly connected", "directly attached" or "directly coupled" to another element, there are no intervening elements present. Although described or shown with respect to one embodiment, the features so described or shown can apply to other embodiments.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein.

The word "card" refers to a printed circuit board (PCB). The word "board" refers to a PCB of any shape, typically held in an enclosure for environmental and safety protections.

Figure 2:
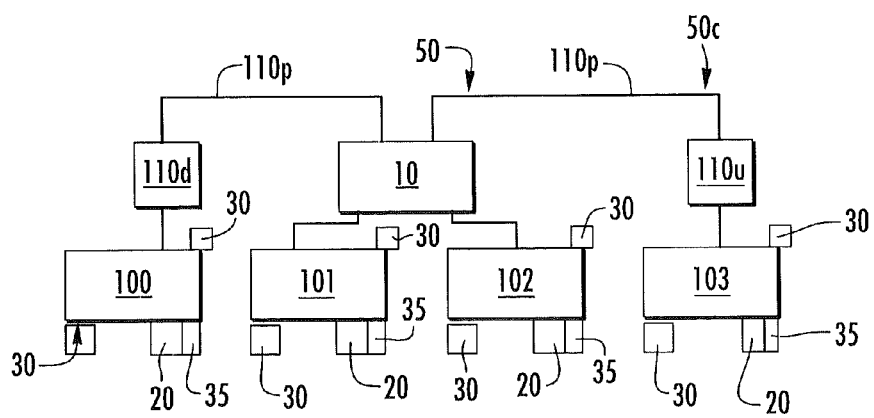
FIG. 2 is a schematic illustration of an exemplary zoned conveyor system that can operate using the controller device shown in FIG. 1 according to embodiments of the present invention.

FIG. 1 is a schematic illustration of an exemplary controller device 10 used for controlling zoned conveyor sections 100-103 (FIG. 2). The device 10 is typically implemented as a single controller card, but may also be implemented as a plurality of cards that electrically communicate. If the latter, the cards may be held by a common mounting platform or may be distributed in different devices and locations via wired or wireless connections. In some embodiments, the connections may include LAN, WAN or Internet connections.

As shown in FIG. 1, the controller device 10 includes a primary (typically single) card 10 with on-board electronics 10e and control logic 10c that can provide for Sequential Release Control for start-up and, optionally, a Singulated Release Mode. The controller device 10 can be configured to mount to a conveyor zone (typically covered for environmental protection and user safety) using tabs 11. The controller device 10 can monitor and control at least one drive motor 20 for a respective conveyor zone (100-103, FIG. 2). The conveyor zones typically include at least one drive motor 20 that drives a belt that moves the conveyor support surface, e.g., rollers. The drive motors 20 can be brushless motors such as those used in motors associated with RollerDrive® motors for conveyor systems such as conveyor systems with integrated electric motor and rollers and/or belts, available from Interroll, Inc., Wilmington, N.C.

As shown, the controller device 10 can include a series of dipswitches 10s. The device 10 is configured to communicate with downstream and upstream peer-to-peer control circuits of associated conveyor zones, typically via controller cards 110d, 100u. The controller device 10 can include one or more ports 20p, 30p and communicates with sensors 30 associated with one or more different conveyor zones 100-105 (FIG. 2). The sensors 30 can include position sensors 30, and a respective at least one motor sensor 35 such as a current draw sensor for a drive motor and/or a motor speed sensor. It is noted that the communications with or between local and/or remote components can be either wired or wireless.

The user interface dipswitches 10d can be configured as shown in the table below.

TABLE 1

Exemplary DipSwitch Configuration

| Switch | Type | On | Off |
|---|---|---|---|
| SW1 | Logic | PNP | NPN |
| SW2 | Rotation | CW | CCW |
| SW3 | Singulation | Enhanced | Standard |
| SW4 | Upstream | Override | Standard |
| SW5 | Downstream | Override | Standard |
| SW6 | Motor Select | Future, EC120 | EC100, EC110 |
| SW7 | Motor Select | Future, EC110 | EC100, EC120 |

The controller device 10 can be backward compatible to work with one or a plurality of different drive motors 20, including those with different gear ratios such as the EC100, EC110 and EC 120 used in older conveyor systems of Interroll, Inc. Examples of drive systems with drive motors and idlers are described in U.S. Pat. Nos. 5,089,596, 5,285,887 and 5,228,558, the contents of which are hereby incorporated by reference as if recited in full herein. The drive motors 20 can be in a self-contained drive assembly with a drive roller and idler rollers driven by the driver roller and does not require external drive means. However, in other embodiments, external drive systems can be used. The systems 50 can include a BLDC (brushless DC) motor connector such as an 8-position 2 mm-pitch header available from Amp or Tyco (179123-8 or equivalent). This type of connector provides motor winding inputs 0-2, and Hall Effect sensor inputs 0, 1, 2, and Hall Effect sensor power and ground.

For the use of a multi-purpose control device (e.g., card) 10, there are three primary differences with controlling different motors (different motor types/gear ratios, etc.). The first difference is the actual speed setting for each motor (each motor rotates at the same constant speed but this speed can be different for each motor). The second difference is the current draw associated with each motor. The third difference is the temperature control algorithms utilized for each motor and motor gear/box combination. Although there are many motor/gear box combinations, they can be reduced to three stages (stages 1, 2 and 3) for temperature control. With three motors and three stages for EC120 and EC110 as well as two stages for EC100, the resulting number of combinations can be reduced to eight possible motor/gear box temperature control parameter settings selectable or programmable by the control device 10.

FIG. 1 also illustrates that the controller device 10 can include a user interface 15 that can be accessible via an on-board HMI (Human Machine Interface) or via a connection with a remote or local computer including a portable pervasive communications device such as a notebook, laptop, handheld or other portable computer. The controller device 10 can include a Jbug interface 19 which allows an operator or technician to troubleshoot or upgrade a circuit (firmware, software and the like). FIG. 6 illustrates an exemplary set of inputs and outputs.

The controller device 10 can also include an external control input 18. The external control input 18 can have various functions depending on zone type. The external control input 18 can include a 16 position rotary switch and the motor speed can be set using a multi-position rotary switch (replacing the potentiometer on conventional systems). There can be 16 positions: Position 1 can run the motor at ⅓ full speed, and Position 16 can run the motor at full speed. All positions between 1 and 16 can control the motor at equal increments between ⅓ and full speed.

TABLE 2

Speed Configuration Table

| Rotary Switch Selection | Speed Request Value | Percentage of Full Speed | Memory Address |
| --- | --- | --- | --- |
| 0 | 84 | 33% | 0327 |
| 1 | 95 | 37% | 0328 |
| 2 | 107 | 42% | 0329 |
| 3 | 118 | 46% | 032A |
| 4 | 130 | 51% | 032B |
| 5 | 141 | 55% | 032C |
| 6 | 152 | 60% | 032D |
| 7 | 164 | 64% | 032E |
| 8 | 175 | 69% | 032F |
| 9 | 187 | 73% | 0330 |
| A | 198 | 78% | 0331 |
| B | 209 | 82% | 0332 |
| C | 221 | 87% | 0333 |
| D | 232 | 91% | 0334 |
| E | 244 | 96% | 0335 |
| F | 255 | 100% | 0336 |

TABLE 3

Acceleration Table

| Rotary Switch Selection | Accel Value | Memory Address |
| --- | --- | --- |
| 0 | 10 | 0337 |
| 1 | 26 | 0338 |
| 2 | 43 | 0339 |
| 3 | 59 | 033A |
| 4 | 75 | 033B |
| 5 | 91 | 033C |
| 6 | 107 | 033D |
| 7 | 123 | 033E |
| 8 | 140 | 033F |
| 9 | 156 | 0340 |
| A | 173 | 0341 |
| B | 189 | 0342 |
| C | 205 | 0343 |
| D | 221 | 0344 |
| E | 238 | 0345 |
| F | 254 | 0346 |

TABLE 4

DECEL Table

| Rotary Switch Selection | Decel Value | Memory Address |
| --- | --- | --- |
| 0 | 22 | 0347 |
| 1 | 27 | 0348 |
| 2 | 33 | 0349 |
| 3 | 38 | 034A |
| 4 | 44 | 034B |
| 5 | 49 | 034C |
| 6 | 55 | 034D |
| 7 | 60 | 034E |
| 8 | 65 | 034F |
| 9 | 71 | 0350 |
| A | 77 | 0351 |
| B | 82 | 0352 |
| C | 88 | 0353 |
| D | 96 | 0354 |
| E | 99 | 0355 |
| F | 104 | 0356 |

The Decel Value is the speed the motor can be slowed to before dynamic braking is applied.

FIG. 2 illustrates an example of a conveyor system 50 with series of conveyor zones 100-103 (shown as four but more or less can be used). The system 50 include a controller device 10 (typically implemented as a single controller card) and a peer-to-peer communication path 110 with connections to upstream and downstream cards 110u, 110d (e.g. slave-type control cards), and zones 100-103 can include at least one drive motor 20 and at least one position sensor 30, typically located on a trailing and/or leading edge portion. The controller card 10 can include control logic that facilitates or controls various modes of operation, including, for example, a Sequential Release Control and Zero Pressure Accumulation (ZPA) modes, in which serially adjacent objects being transported do not touch each other.

Figure 3:
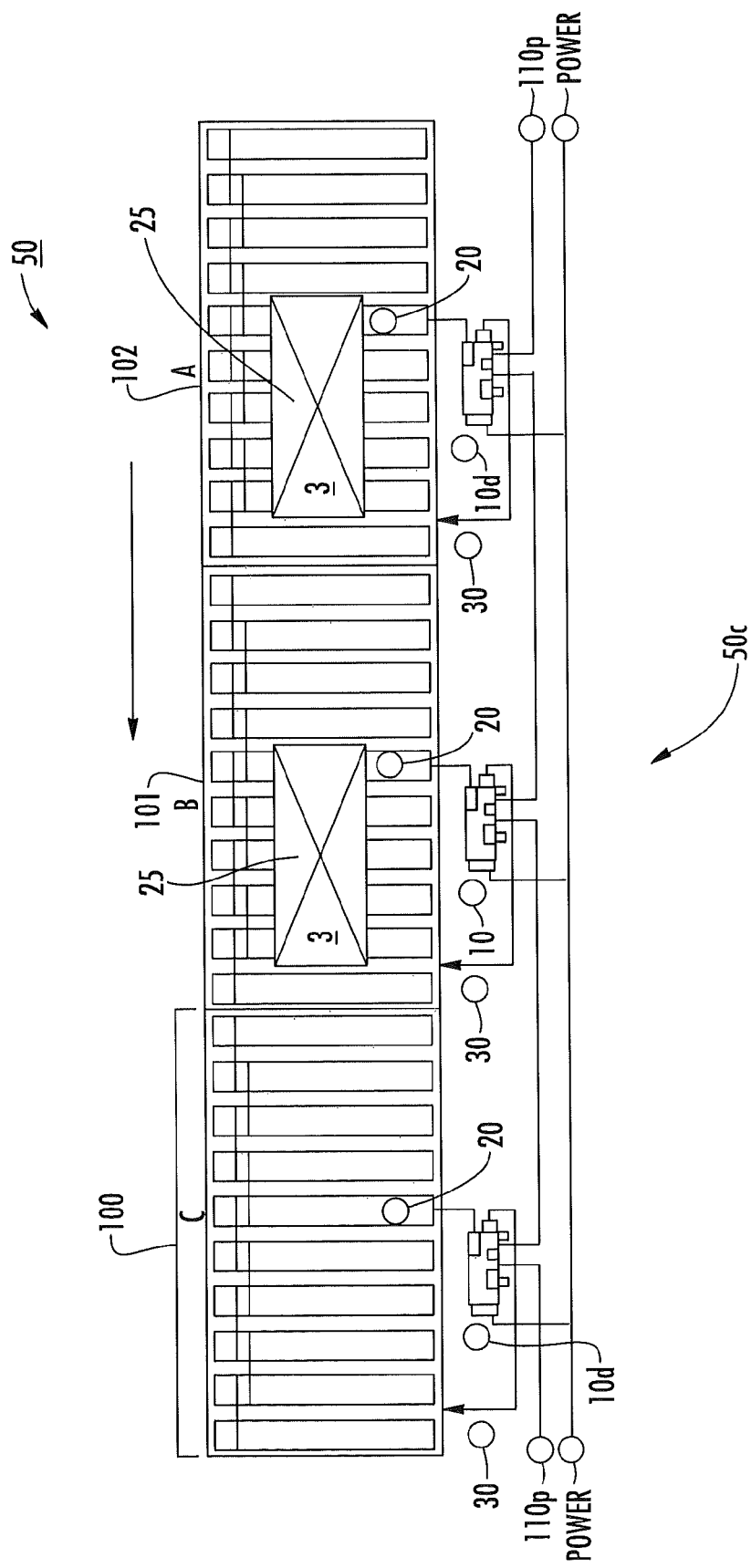
FIG. 3 is a top view of an exemplary zoned conveyor system that can use the controller device of FIG. 1 according to embodiments of the present invention.

FIG. 3 illustrates a conveyor system 50 with a target object 25 being transported and each zone 100-103 including a drive control 10d for the motor 20, at least one of which is the primary logic card 10. The drive controls 10d can be connected via peer-to-peer communication path 110 (which can be wired or wireless) and each drive control 10d can be powered by a common power line (typically about +24VDC/GND). However, separate power lines and sources can be used. As shown, Zone B (101) can be designated as reference, Zone A can be the upstream zone 102 and Zone C can be the downstream zone 100.

Figure 4:
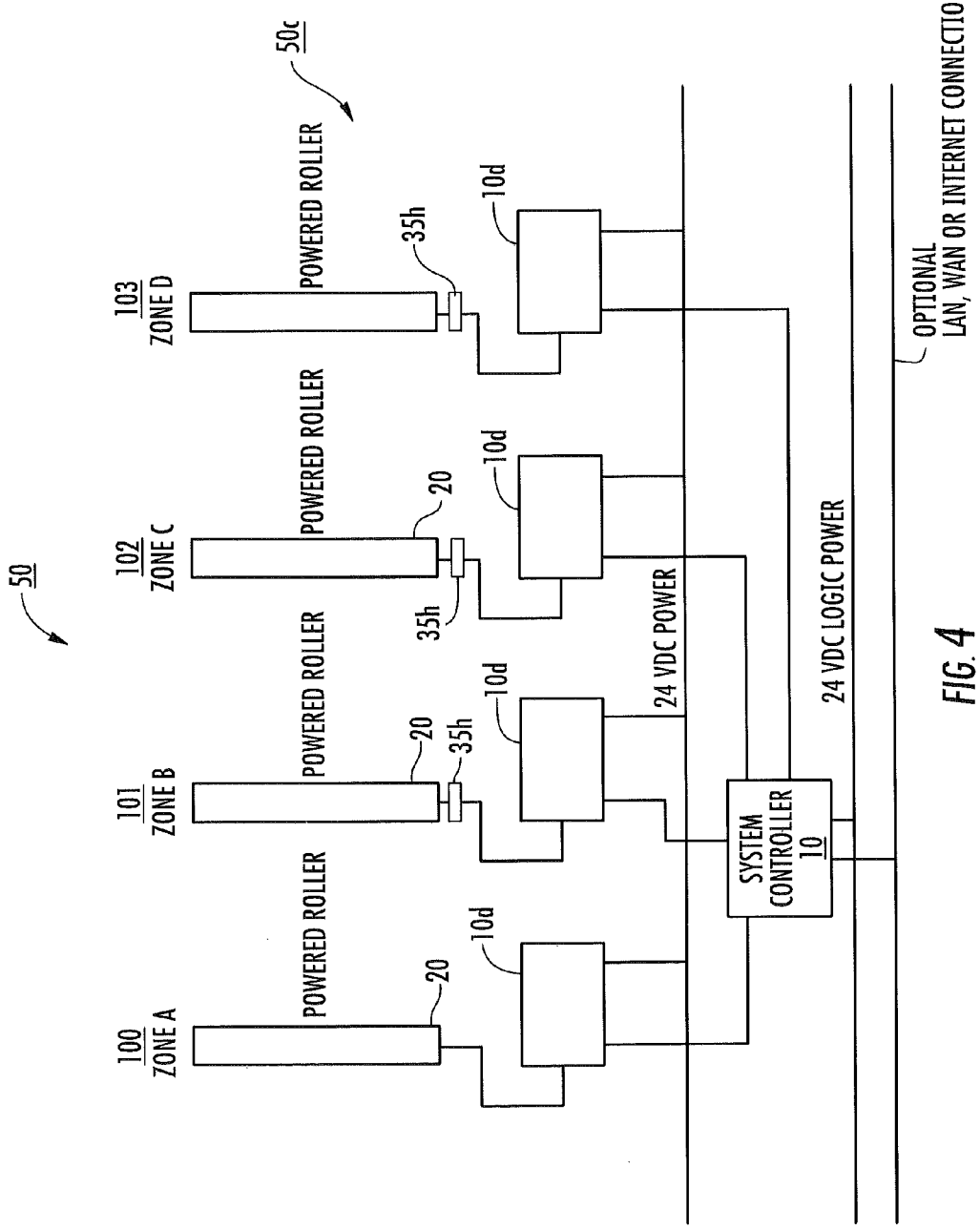
FIG. 4 is a schematic illustration of a zoned conveyor system that can use the controller device of FIG. 1 according to yet other embodiments of the present invention.

FIG. 4 illustrates another embodiment of the conveyor system 50 with individual motor drive control cards 10d and a system card 10 that communicates with a plurality of the cards 10d. The drive motors 20 are each in communication with at least one Hall-effect sensor 35h.

Generally stated, embodiments of the invention use non-time based sequential controls for zoned conveyor systems 50 ("Sequential Release Control"). The control system of the conveyor system 50 can be configured to provide for ZPA operation. A conveyor system can include a control circuit 50c that can include a controller card to drive each zone or segment, a single controller card for all segments, several controller cards to control a respective one or several segments, master-slave controller card arrangements and other logic-controlled motor control and/or zone release systems.

The zoned conveyor systems 50 can be floor supported, wall or ceiling suspended conveyor systems, or combinations of same. For suspended conveyor zones, the control circuit start-up process can reduce lateral inertial forces applied to the conveyor zones upon start-up of the drive motors of the conveyor zones which can tend to cause swaying of (suspended) conveyor zones. It is contemplated that the new control systems can be implemented onto existing conveyor systems of various configurations without requiring costly hardware upgrades using existing electronic and hardware components.

For singulated release, typically, a zone uses only one position sensor 30, typically located proximate its downstream edge portion (FIG. 3) but, where used, the position sensor can be positioned at other locations as well. The system can use input from the upstream zone's sensor 30 to monitor its upstream edge. An entry zone can have a second sensor 30 to detect when an OBT ("Object Being Transported") 25 enters into its zone, since there are no zones located upstream of the entry zone. There are typically four types of zones: Entry Zone (the first zone on a conveyor system, or if a PLC (programmable logic controller) is used, the Entry Zone controls starts at the upstream edge, thus using smart I/O handshaking)), Exit Zone (the last zone on a conveyor system, or if a PLC is used, this zone can control starts at the downstream edge, using smart I/O handshaking), Transport Zone (a zone that typically uses peer-to-peer communication to control OBT entry and exit) and a Slave Zone (a zone that simply runs when instructed to). Normal flow of the conveyor is from right to left with the drive motor 20 (e.g., RollerDrive®) rotating a roller or transport surface CCW. When given a signal to reverse the drive motor 20 (e.g., RollerDrive®) will rotate CW, making the direction of the conveyance travel from left to right. The reverse signal can also turn Entry Zones into Exit Zones and can make a sensor 30 an upstream edge sensor instead of a downstream edge sensor.

In some embodiments, the start-up of multiple conveyor segments (also referred to as zones) positioned in series will occur sequentially. The start-up of each segment can be based on defined threshold levels for speed and current draw of the drive motors 20 associated with a respective segment or zone. Typically, the last segment in a series (the most downstream segment in that series) will begin motion by increasing power to the motor at a rate of change ("Ramp-Up Rate") to bring the motor up to a desired operating speed. The Ramp-Up Rate can be a constant rate and different Ramp-Up Rates may be used for different zones. The control circuit 50c can be configured to define speed and current draw threshold values or ranges. Once an upstream conveyor meets the threshold value, a second conveyor can be directed to begin power-up. By integrating various "Ramp-Up" rates, it is believed that the dynamic and power spikes can be minimized more than is possible with a timed-release system.

Typically, the controller card 10, 10d in communication with or connected to a last segment 100 will monitor current draw and motor speed until threshold values for current draw and speed have been met. Once met, the first segment controller card 10 will signal the upstream segment 101 to activate motion. This second conveyor 101 will repeat the process performed by the downstream conveyor 100. The process can repeat until all conveyors in the series are in motion.

The controller device 10 can be configured to direct a first upstream conveyor 101 to initiate operation based on first current draw level and speed of the first (e.g, downstream) segment 100 and direct a second upstream conveyor 102 to subsequently initiate operation based on a different second current draw level. For initial startup of zones, the downstream zone can perform one full revolution before the upstream starts sending an OBT. This can help minimize power spikes from zones starting simultaneously.

Figure 14:
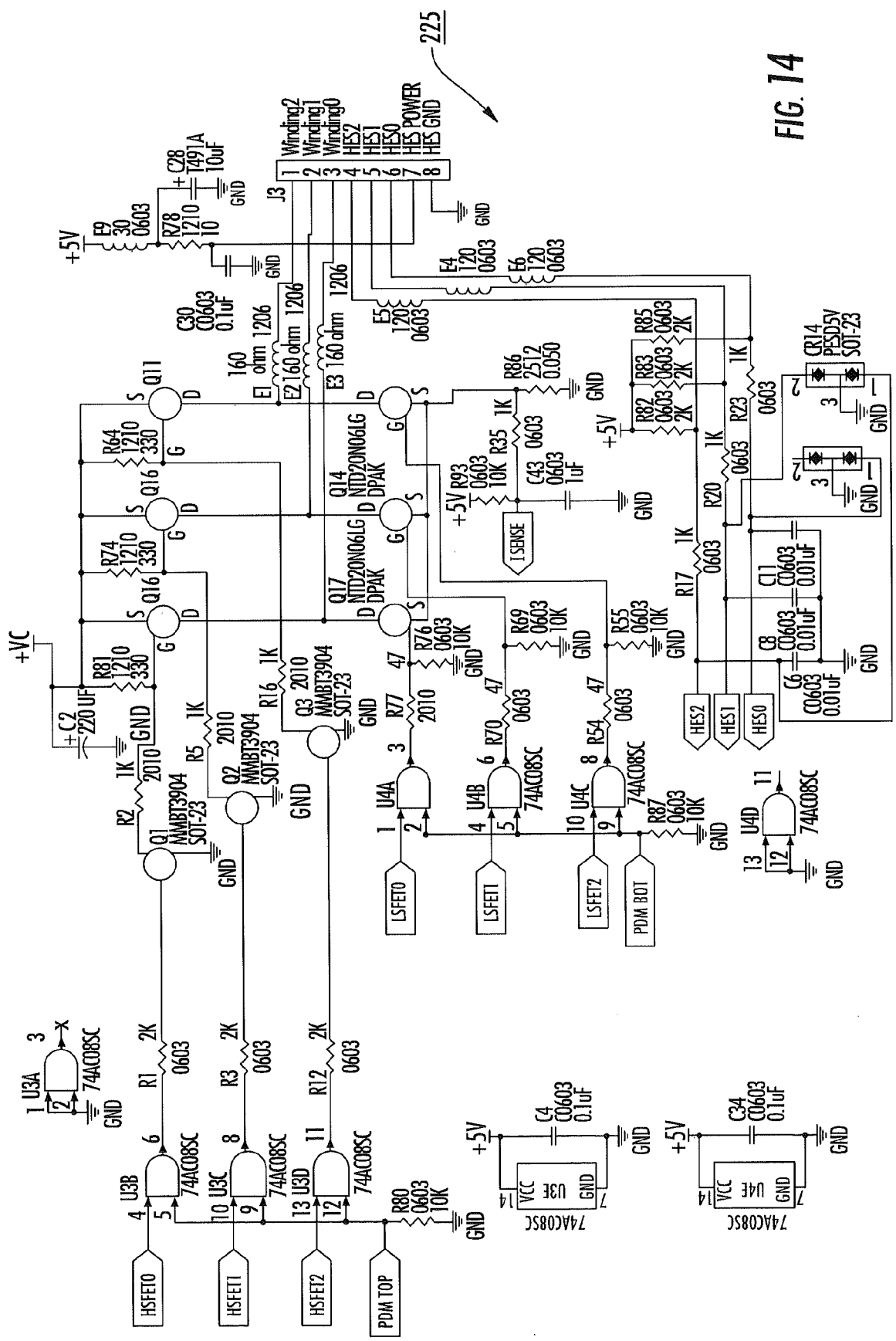
FIG. 14 is a diagram of a motor control circuit according to embodiments of the present invention.
Figure 15A:
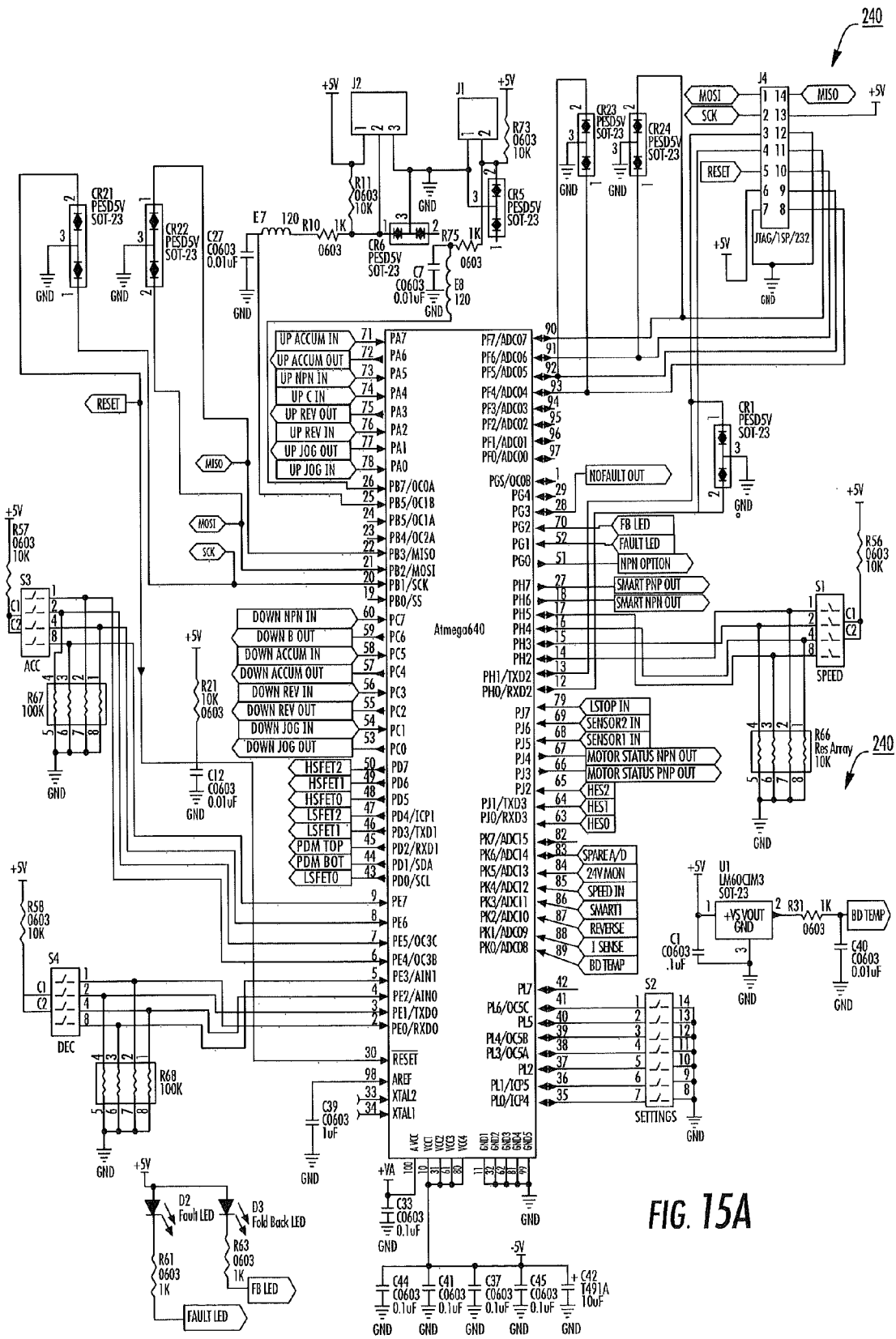
FIG. 15A is a diagram of a main CPU circuit according to embodiments of the present invention.
Figure 15B:
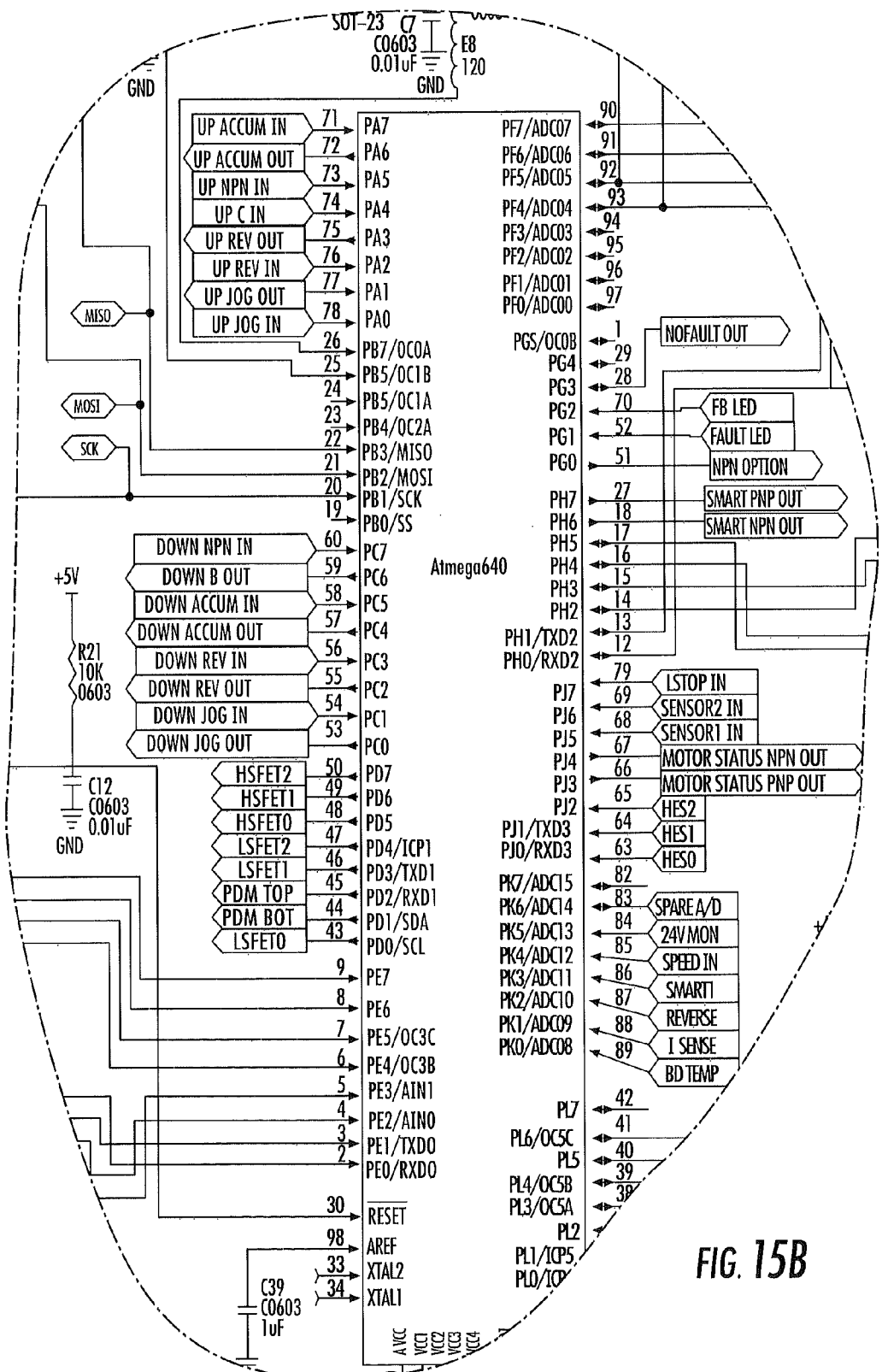
FIG. 15B is an enlarged portion of the main CPU circuit shown in FIG. 15A.

In particular embodiments, the control device 10 can include motor control sensor inputs 20p (FIG. 1) which include Hall effect sensor inputs (FIGS. 14, 15A, 15B) and an Isense (current sense) input to a controller (CPU or processor) to monitor current draw of the motor (FIGS. 14, 15A, 15B).

Note that the device 10 typically controls high side and low side FETS (HFETs, LFETs, respectively) (FIGS. 14, 15A, 15B) so that the LFETs are turned on during no-load stops which can speed up the stopping when not using dynamic braking and eliminate or reduce overshoot (roller spins forward, backward, forward, etc.).

The device 10 can include an Acceleration/Deceleration onboard rotary switch (which can be a 16 position on switch) that will control the ramp up and ramp down rates for each motor 20. The device 10 can also include a speed rotary switch (e.g., an onboard 16 position rotary switch) that can control the speed of the motor (as noted above the speed can be set between 33%-100% of the target speed of the motor).

In other embodiments, start-up of multiple conveyor segments 100-103 (FIGS. 2, 3) positioned in series can occur sequentially and the start-up of each segment can be determined by counting the number of motor revolutions for a respective drive motor (usually one for each segment), then signaling the upstream conveyor to start after the pre-set count has been reached. The rotational count can be based on a number of pulses detected by a sensor in communication with a rotating member connected to the drive motor (gear, shaft or the like) and/or conveyor support surface (e.g., rollers). This control system is also not time-based. One or more Hall-effect sensors 20h (FIG. 4) in a respective drive motor 20 can be used to provide the revolution count signal (e.g., Hall-effect signal pulses). However, alternative sensors can be used as well for this input. Counting revolutions (typically pulses associated with the revolutions), then staggering the start-up is also believed to be an effective way of implementing a staggered release that can reduce and/or minimize start-up current draw and dynamic loading of the system. The process can repeat until all conveyors in the series are in motion. For suspended conveyor zones, this process can reduce lateral inertial forces applied to the conveyor zones upon start-up of the drive motors of the conveyor zones which can tend to cause swinging of the conveyor zones.

The control circuit 50c (or card 10) can be configured to operate with conveyor zones having different gear box ratios. For example, various conveyor zones 100, 101, 102, 103 may include one or more of each of a low ratio (typically 4:1), a standard ratio (above 4:1, typically about 16:1), or high ratio (above 16:1, typically up to about 96:1). Each gear box ratio is associated with a different number of rotations used to get the drive motor 20 and associated zone up to a desired speed at a particular defined ramp up rate. The control circuit 50c (e.g, card 10) can be configured to define the number of counts associated with initiation of the next zone based on what type of gear box ratio is in the current zone undergoing initiation (e.g., whether it is a is a standard, high or low ratio gear box). The controller card 10 and/or control circuit 50c can be configured to electronically determine the gear box ratio associated with each zone based on the type of drive motor, serial number, part number, test signal sent to the drive motor or zone or other interrogation means or the control circuit may accept user input to identify the gear ratio for each zone during an on-boarding installation.

In some embodiments, the controller card 10 may also include singulated release control logic. The singulated release control logic can define a travel distance associated with belt displacement by counting the number of Hall effect pulses associated with drive motor revolutions (using Hall-effect sensors and a motor revolution counter associated with belt displacement), rather than using a predetermined position and downstream position sensor, to control start and stop of adjacent conveyor zones. The control logic can allow for different distance settings that can be used depending on a customer's spacing needs without requiring any physical movement of sensors. For example, a defined number of motor revolutions can be associated with a defined length and this count can be electronically incremented or decremented to adjust load spacing without requiring physical movement of the sensor(s).

The controller card 10 can include a Displacement Learning Module which may use two position sensors to establish actual distance associated with revolutions and/or belt displacement for a particular zone, but this part of the operation is not used for singulated release; it is used for calibration or parameter setting of the distance used for the motor revolution/belt displacement counter for subsequent singulated release mode.

In use, singulated package release can be performed by monitoring a position sensor at the end of an upstream conveyor in combination with control of conveyor belt displacement of an immediate downstream neighboring conveyor segment/zone. The upstream conveyor sensor can sense the leading edge of a package. Once the leading edge is sensed, this conveyor will stop. The downstream conveyor can continue moving until the previous package has moved a defined distance along the downstream conveyor. The distance is determined by a controller (e.g., the downstream controller) counting motor revolutions, e.g., Hall-effect pulses associated with the motor revolutions, to advance the belt, and hence the package, a defined distance associated with a defined number of pulses. This distance may vary slightly. Once the defined distance is obtained by the downstream conveyor, the control circuit, e.g., downstream controller, can reset its motor revolution/belt displacement counter and signal the upstream conveyor to activate to move the next package onto the downstream conveyor. Stated differently, once the prescribed distance has been obtained by the downstream conveyor, the downstream controller can reset its motor revolution counter, signal release of the package on the downstream conveyor and signal the upstream conveyor to activate, thus moving the first package off the downstream zone and the next package onto the downstream conveyor zone from the upstream conveyor zone. To restart the zones, a "Sequential Release Control" mode can be used as described above to reduce current draw spikes and/or dynamic sway issues associated with two conveyors starting up simultaneously. Thus, in some embodiments, the upstream and down stream conveyors do not start-up simultaneously.

The belt displacement and/or number of motor revolutions can be variables that are set using a Hyper-terminal or other interface at installation or set-up. The values for the variables can be derived from a look-up table (electronic library or user reference manual) that includes displacement variables for combinations of motors and gear boxes. The singulated release logic can be implemented using a single controller card for conveyors associated with the singulated release or may be distributed over several controller cards. Conveyors upstream and/or downstream of the two conveyors can be controlled via the same controller card for the singulated mode and may also use existing controller cards.

In some embodiments, the controller device 10 and/or control circuit 50c can include a "Displacement Learn Mode" for use at installation or set-up that associates a defined travel distance with a particular zone based on motor type, gear ratio, belt displacement, zone length and the like. For example, an installer can set the defined distance associated with belt displacement, revolutions or motor type during installation by putting the controller card in a singulated release mode using the on-card electronics 10e, such as dip switches, and then providing an input signal to the second conveyor's position (typically optical) sensor input port when the package 25 on the conveyor reaches a preferred position on the belt. This input can be supplied to one or more of the controller cards' 10, 10d (optical) sensor input port using an actual position (e.g., optical) sensor or a simulated electrical input. The controller 10 can capture the belt's displacement when it receives the signal. Once the count has been captured, the sensor port 22 (FIG. 1) can be disabled for use with singulated release position sensing for singulated release run modes.

Note that this approach creates a scenario where the (optical) sensor 30 is not needed on the downstream conveyor for singulated release and may provide cost savings over conventional systems. If the installer or user needs to reset the displacement (load travel distance or load spacing) setting, this can be performed in a number of ways. For example, the displacement setting can be reset using the electronics on the controller card, e.g., dip-switches on the card, by switching singulated release mode off/on. The card 10 would then be ready to accept a new displacement value.

It may also be possible to reset the displacement setting by providing multiple input signals to the card's sensor port in rapid succession, for example 10 pulses in less than 5 seconds. This relearn or reset mode can eliminate the need for the user to touch the controller card 10 to reset the displacement setting. Also, the displacement setting can be electronically reset by providing a coded pulsed signal to the card's optical sensor port. For example, the system can be configured to transmit series of pulses in a defined format and time constraint period. For example, the system can transmit 3 short pulses, followed by 3 long pulses, followed by 3 short pulses; all occurring within a time constraint. The use of a "Learning Displacement Mode" can be used in the alternative to manually setting the displacement variable at set-up or installation by a user (e.g., via the Jbug interface or a Hyper-terminal interface).

The controller device 10 can operate with the "Learn Mode" using two or more variables. In some embodiments, the variables are identified as siHES_Counter, siHesChangeCount. In this embodiment, the siHES_Counter stores how many HES changes occurred from the time an OBT 25 started into the zone until the leading edge of the OBT 25 reaches that zone's sensor. This number is used to determine zone length. siHesChangeCount increments by one every time there is a HES change. This variable is reset to zero every time an OBT 25 starts to enter into a zone, and is compared against siHES_Counter to determine when the OBT 25 should be at the end of the zone. This is also used to check for Jam1 errors, if the OBT 25 does not get to the zone's sensor by the end of the count, then the motor turns off.

Initially siHES_Counter is 0xFF(−1), which means that the zone has not learned it zone length. Therefore, when an OBT's leading edge first enters the zone, the siHesChangeCount is set to zero then begins counting HES changes until the leading edge of the OBT gets to the zone's sensor. The firmware then sees that siHES_Counter is 0xFF so it takes the final value of siHesChangeCount and stores it to siHES_Counter and saves the value into EEPROM, so that the length can be remembered after being powered down. Once siHES_Counter is set, every time an OBT enters the zone it is compared with siHesChangeCount to determine when the OBT should be at the end of the zone.

This value may be reset at anytime by jumping the Learn mode jumper for approximately 2 sec. When this occurs, siHES_Counter is set back to 0xFF(−1), Therefore, when a new OBT's leading edge enters the zone, the zone begins learning the zone length again.

A) OBT's leading edge is at the upstream sensor. Zone 2 begins counting everytime the HES changes while the motors run.
    B) OBT's leading edge is at the zone's end sensor. Final count of siHesChangeCount is stored to siHES_Counter
    C) Zone length is now learned and ready for new OBTs Jam1/OBT Removed from Zone Detection A) OBT's leading edge is at the upstream sensor. Zone 2 begins counting everytime the HES changes while the motors run.
    B) As the OBT travels through the zone, siHesChangeCount is compared against siHES_Counter. If the OBT has not reached the zone's sensor (as shown in section B above) by the time siHesChangeCount is >=siHES_Counter, then there must be a jam or the OBT has been removed. Turn off zone's motor and set zone state to empty.
    C) Zone is now ready to accept new OBT.

It may be preferable that the (optical) position or proximity sensor 30 remains in use for control uses other than package displacement when in singulated release mode. For example, as a safety precaution, the position or proximity sensor 30 may be used to sense accidental "belt run-off" where a package continues to advance past its prescribed displacement. This might occur during package jams or controller malfunction. In such a scenario, the controller card 10 could control displacement to a distance just short of the captured displacement values (Displacement Count−X Counts) so that the installer could keep a position/proximity (e.g., optical) sensor in location and active for purposes other than singulated release displacement control as a safety/malfunction sensing input.

Embodiments of the present invention may take the form of an entirely software embodiment or an embodiment combining software and hardware aspects, all generally referred to herein as a "circuit" or "module."

Furthermore, embodiments of the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices. Some circuits, modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Embodiments of the present invention are not limited to a particular programming language.

Computer program code for carrying out operations of data processing systems, method steps or actions, modules or circuits (or portions thereof) discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

The present invention is described in part with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing some or all of the functions/acts specified in the flowchart and/or block diagram block or blocks.

The flowcharts and block diagrams of certain of the figures herein illustrate exemplary architecture, functionality, and operation of possible implementations of embodiments of the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order or two or more blocks may be combined, depending upon the functionality involved.

Figure 5:
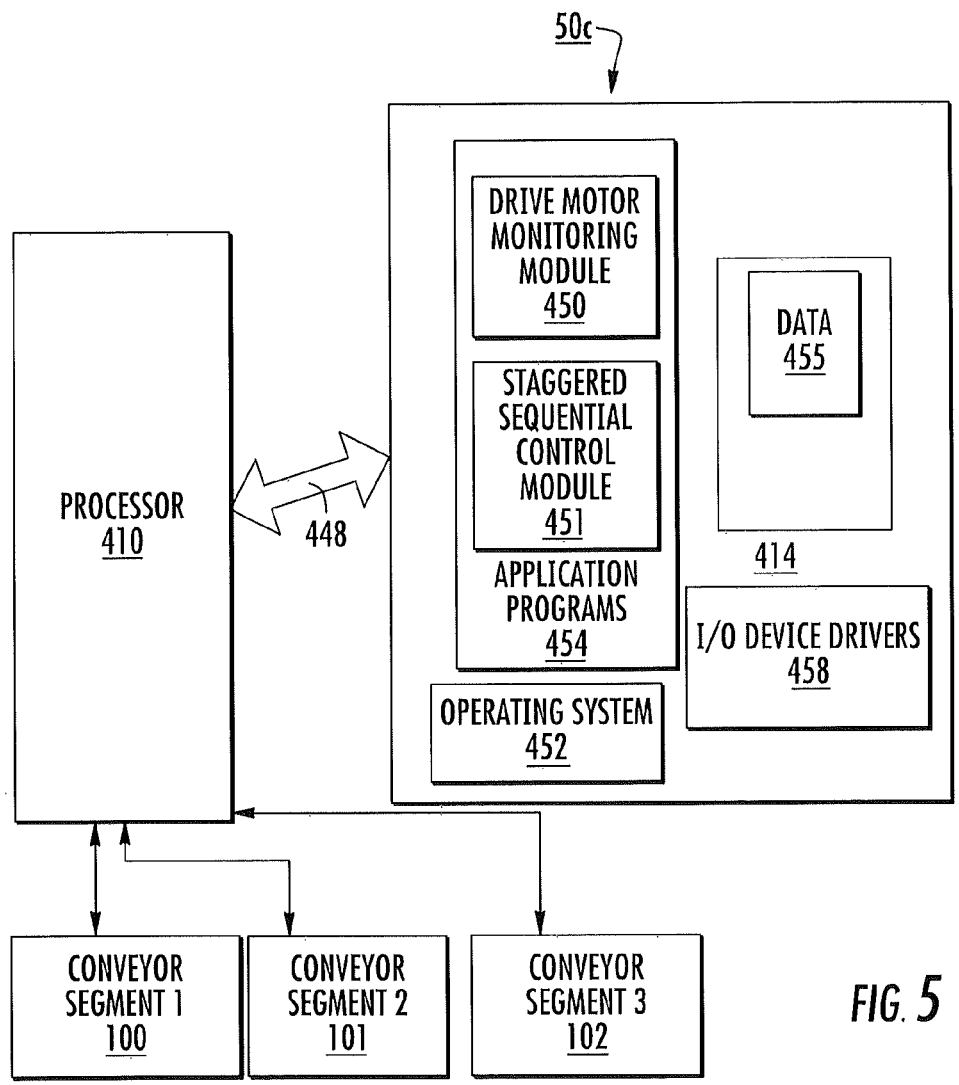
FIG. 5 is a schematic illustration of a data processing system according to embodiments of the present invention.

FIG. 5 is a schematic illustration of a control circuit or data processing system that can be used to control sequential start up of zoned conveyor segments. The circuit and/or data processing system may be incorporated in a digital signal processor in any suitable device or devices. As shown in FIG. 5, the system includes at least one processor 410 and memory 414 that communicates with the processor via an address/data bus 448. The processor 410 can be any commercially available or custom microprocessor. The memory 414 is representative of the overall hierarchy of memory devices containing the software and data used to implement the functionality of the data processing system. The memory 414 can include, but is not limited to, the following types of devices: cache, ROM, PROM, EPROM, EEPROM, flash memory, SRAM, and DRAM.

FIG. 5 illustrates that the memory 414 may include several categories of software and data used in the data processing system: the operating system 452; the application programs 454; the input/output (I/O) device drivers 458; and data 455. The data 455 can include defined ramp-up rates, defined current draw threshold values of drive motors, speed threshold values of drive motors, rotation count levels (hall effect) and the like. FIG. 5 also illustrates the application programs 454 can include a Drive Motor Monitoring Module 450 and a Staggered Sequential Control Module 451 for the different conveyor segments.

As will be appreciated by those of skill in the art, the operating systems 452 may be any operating system suitable for use with a data processing system, such as OS/2, AIX, or zOS from International Business Machines Corporation, Armonk, N.Y., Windows CE, Windows NT, Windows95, Windows98, Windows2000, WindowsXP, Windows Visa, Windows7, Windows CE or other Windows versions from Microsoft Corporation, Redmond, Wash., Palm OS, Symbian OS, Cisco IOS, VxWorks, Unix or Linux, Mac OS from Apple Computer, LabView, or proprietary operating systems.

The I/O device drivers 458 typically include software routines accessed through the operating system 452 by the application programs 454 to communicate with devices such as I/O data port(s), data storage 455 and certain memory 414 components. The application programs 454 are illustrative of the programs that implement the various features of the data processing system and can include at least one application, which supports operations according to embodiments of the present invention. Finally, the data 455 represents the static and dynamic data used by the application programs 454, the operating system 452, the I/O device drivers 458, and other software programs that may reside in the memory 414.

While the present invention is illustrated, for example, with reference to the Modules 450, 451 being application programs in FIG. 5, as will be appreciated by those of skill in the art, other configurations may also be utilized while still benefiting from the teachings of the present invention. For example, the Modules and/or may also be incorporated into the operating system 452, the I/O device drivers 458 or other such logical division of the data processing system. Thus, the present invention should not be construed as limited to the configuration of FIG. 5 which is intended to encompass any configuration capable of carrying out the operations described herein. Further, one or more of modules, i.e., Modules 450, 451 can communicate with or be incorporated totally or partially in other components, such as separate or a single processor or different circuits in the control system of the zoned conveyor system.

The I/O device drivers typically include software routines accessed through the operating system by the application programs to communicate with devices such as I/O data port(s), data storage and certain memory components. The application programs are illustrative of the programs that implement the various features of the data processing system and can include at least one application, which supports operations according to embodiments of the present invention. The data represents the static and dynamic data used by the application programs, the operating system, the I/O device driver and the like.

The control device 10 and/or system control circuit 50c can include the following primary logic, monitoring and control functions.
Initialization
Initialize all the I/O ports, defining whether they are inputs, outputs.
Clear all Registers
Clear SRAM
Initialize EEPROM
Initialize the Jbug parameter table
Set NPN/PNP inputs at midpoint so they have to ramp up or down
Initialize analog bus voltage at minimum
Do an initial read of the Hall Effect Sensors
Initialize the UART
Initialize the RTI
Initialize the Timer
Initialize the AD converter
Initialize the watchdog timer
Read setup switches
Determine motor type from setup switches and set proper parameters values for that motor
Motor Control
Decay Velocity routine removes $\frac{1}{128}$ of value of 16 bit Velcocity called every 300 uS for EC100 and 600 uS for the EC110 and EC120
Monitor HES changes—update velocity and position when change occurs
Velocity control
Position control
Drivemode
Drive the FETS
Translate Analog Speed to Relative speed request
ADC
Creates ADC lookup table
Initialize ADC function to be called by Initialization
Function to do conversion
Function to start conversion
Function to average the conversion result
Timers
50 uS timer
1 mS timer
1 Second timer
Fail Actions
Handle warning actions
Handle fault actions
Control LEDs depending on the situation
System Control
Reads analog inputs from external control
Reads digital inputs from Peer-to-Peer
Determines system reversal
ZPA
Determines zone type
Translates the various analog and digital inputs to be used by the ZPA control algorithm
Handles control of zone
Handle ZPA timers
Singulation
Handles standard singulation and enhanced singulation
Thermal Model
Monitor Current
Calculate expected motor temperature
Jbug
Handles access to parameter table through UART
Learn Routine
Measure distance between upstream sensor and downstream sensor of a zone by counting hall effect pulses/changes. As discussed above, the pulse count can be associated with a desired distance/length of a zone and this result can be electronically saved in memory such as in a look-up chart or parameter table. The system can use this value this to determine if an OBT has reached an end of the zone.

Figure 7:
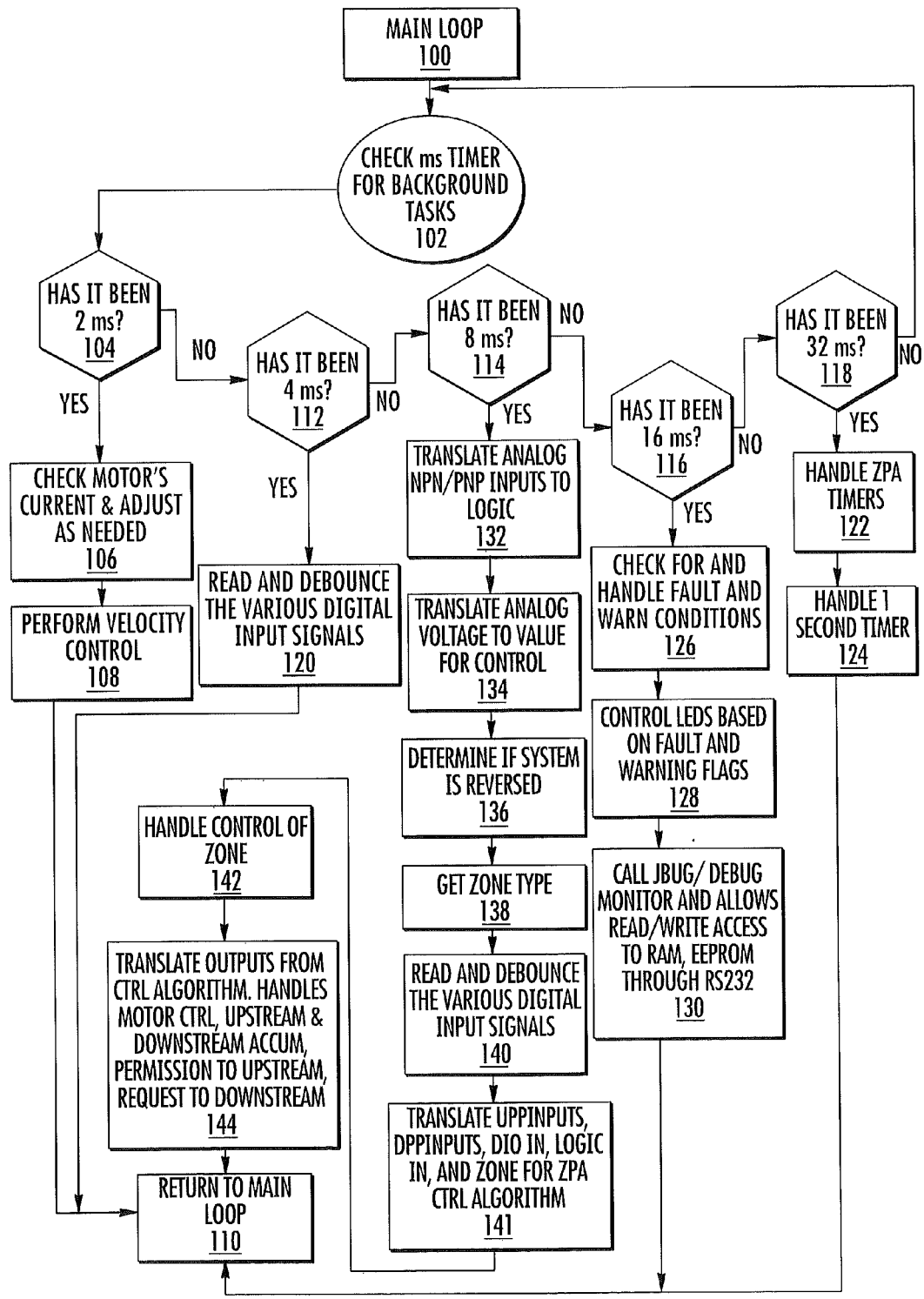
FIG. 7 is a flow chart of exemplary operations that can be used to monitor and control conveyor zones according to embodiments of the present invention.

FIG. 7 is a flow chart of primary monitoring steps (blocks 100-144) that can be used to carry out embodiments of the present invention.

Figure 8A:
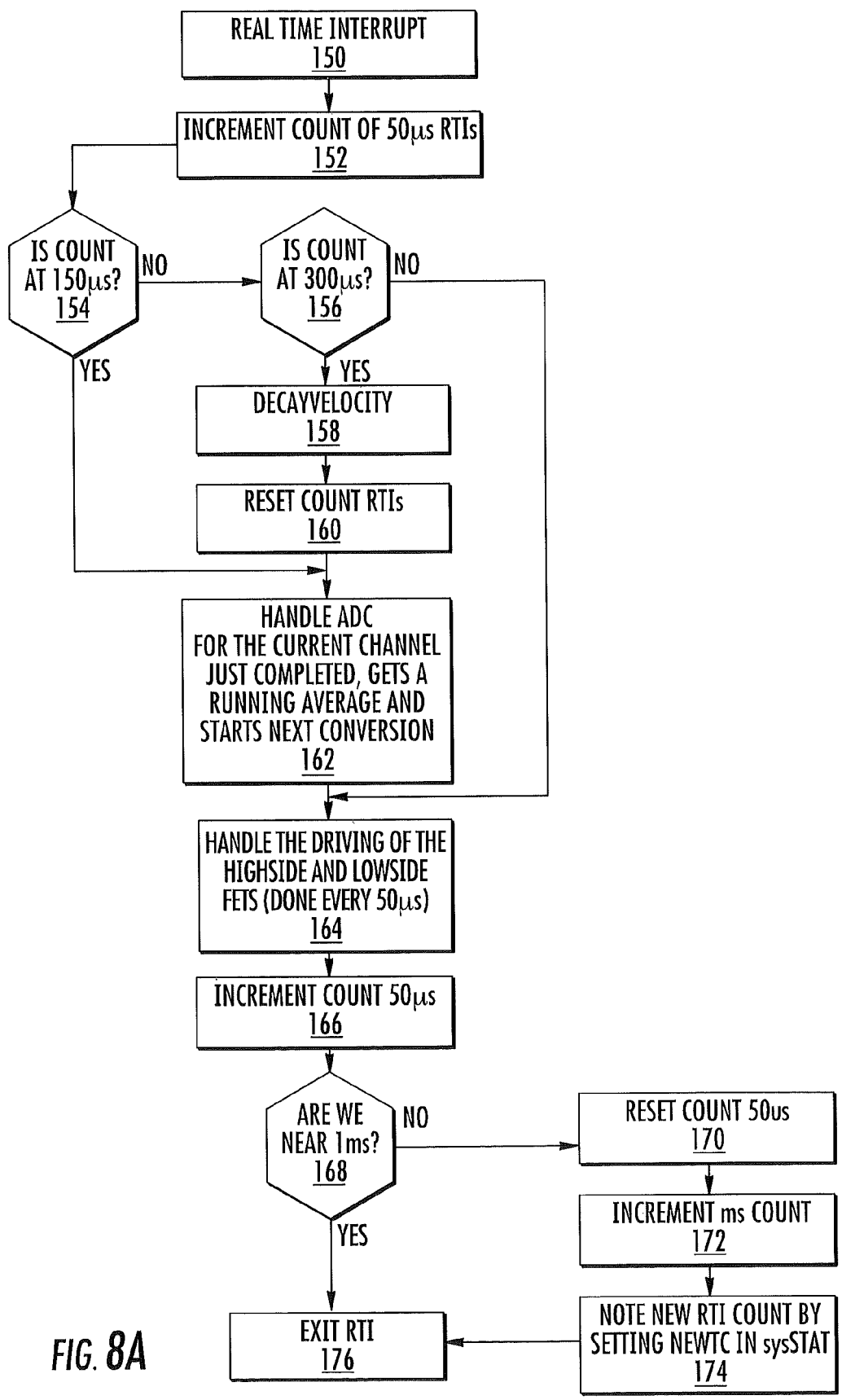
FIGS. 8A and 8B are flow charts of exemplary Real Time Interrupts for zoned conveyor systems that can use a controller device such as that shown in FIG. 1 according to embodiments of the present invention.
Figure 8B:
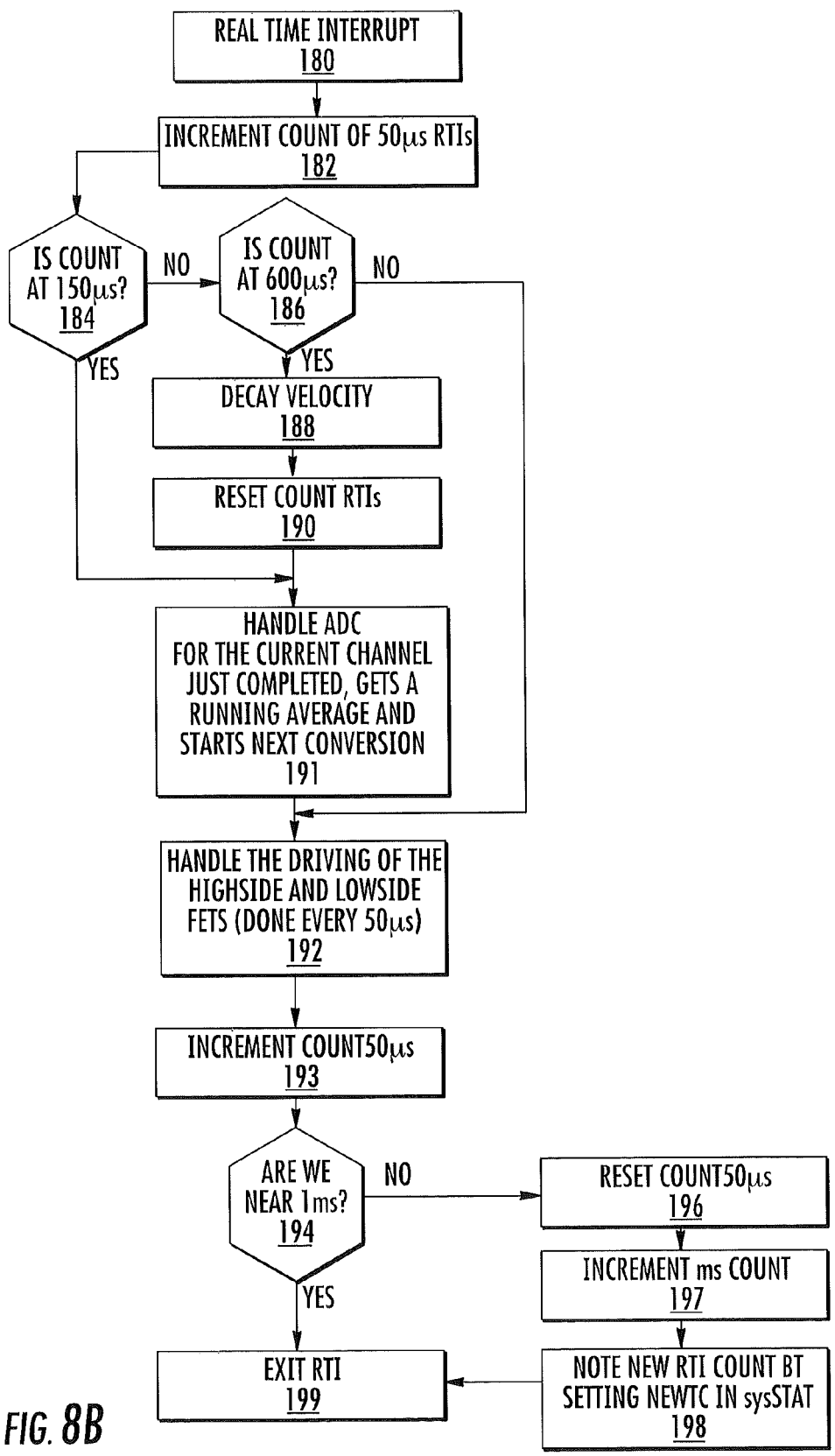

FIGS. 8A and 8B are flow charts of operations that can be used for real time interrupt (RTI) for different motor types. FIG. 8A shows a series of decisions and steps (blocks 150-176). FIG. 8B shows a similar series of decisions and steps (blocks 180-199).

Figure 9:
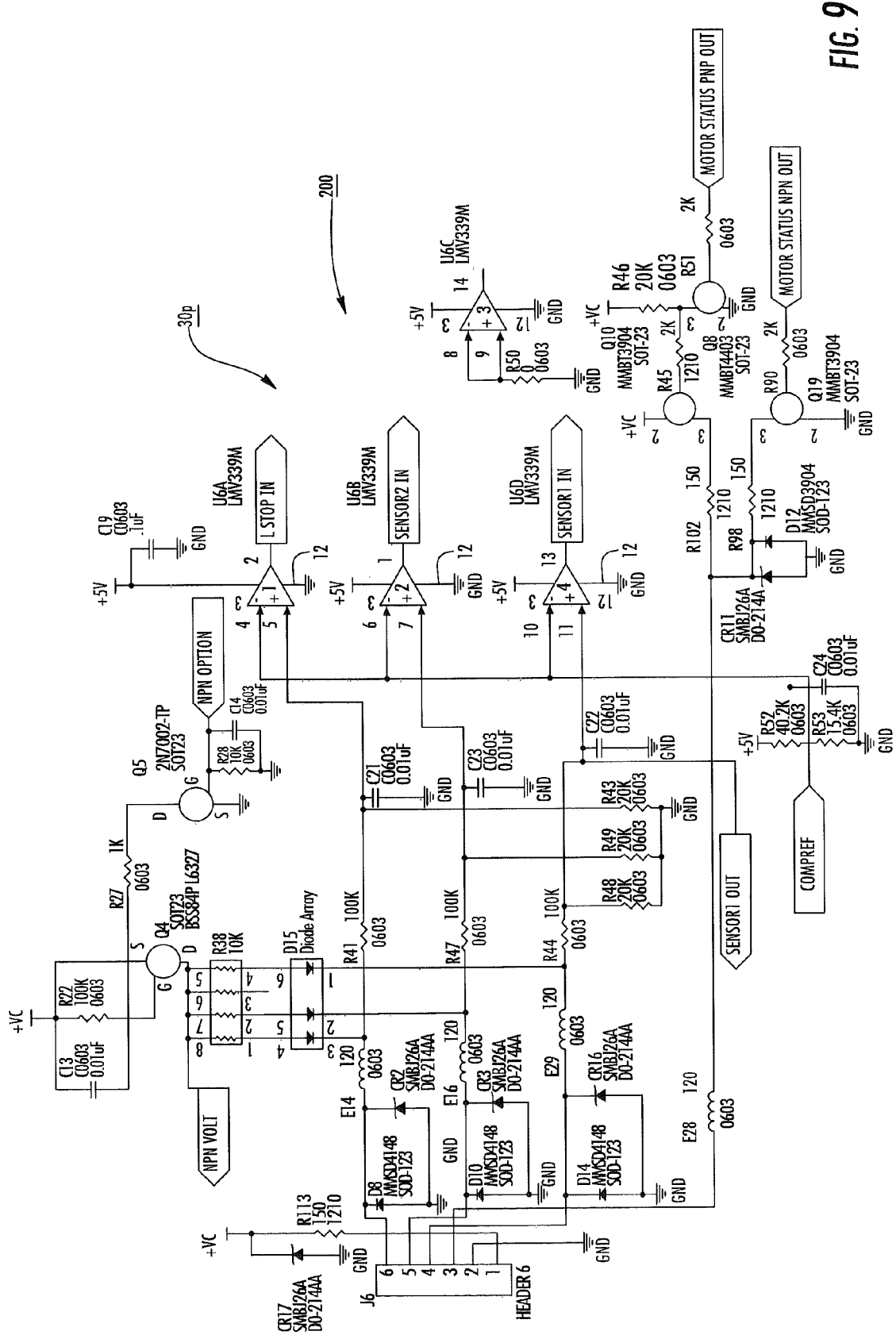
FIG. 9 is a diagram of a sensor interface circuit according to embodiments of the present invention.
Figure 10:
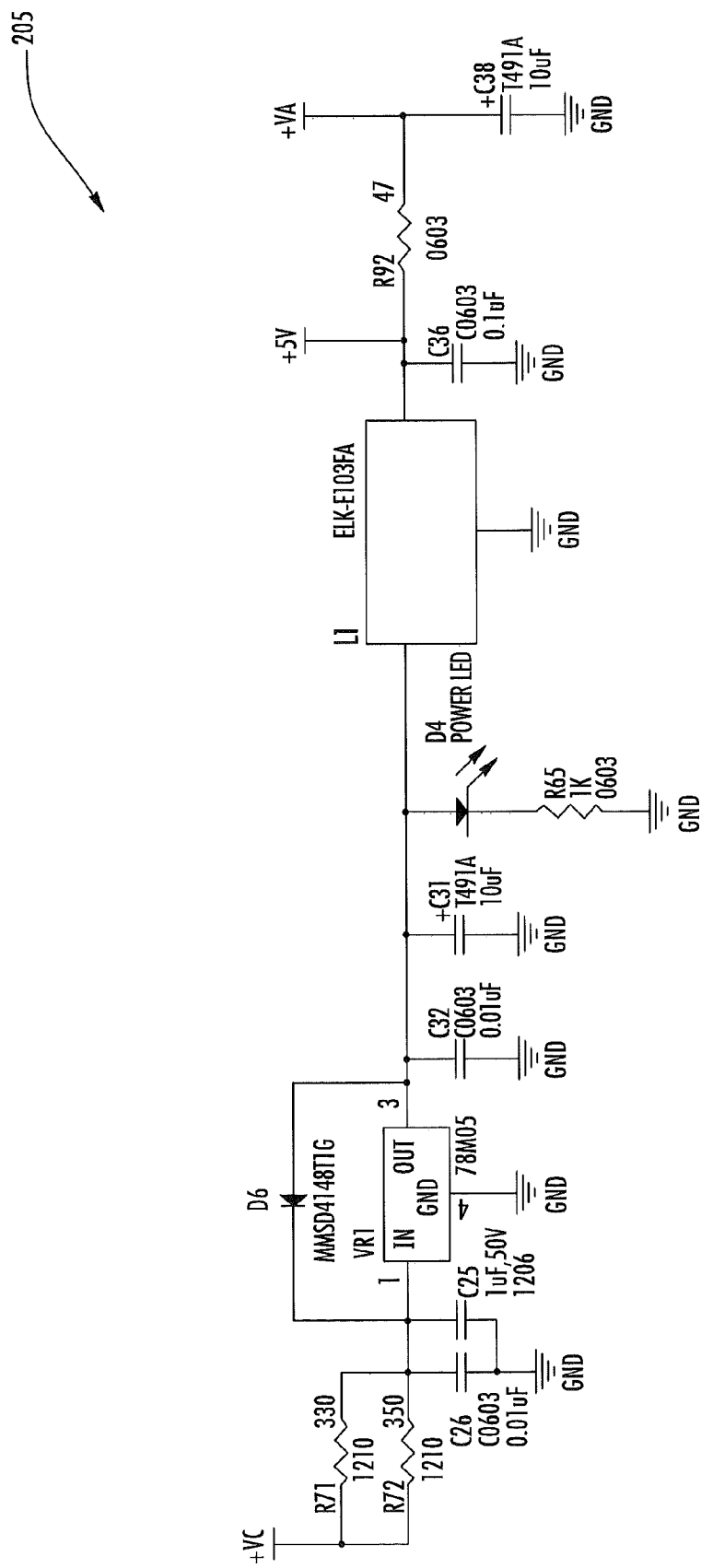
FIG. 10 is a diagram of a power supply circuit according to embodiments of the present invention.
Figure 11:
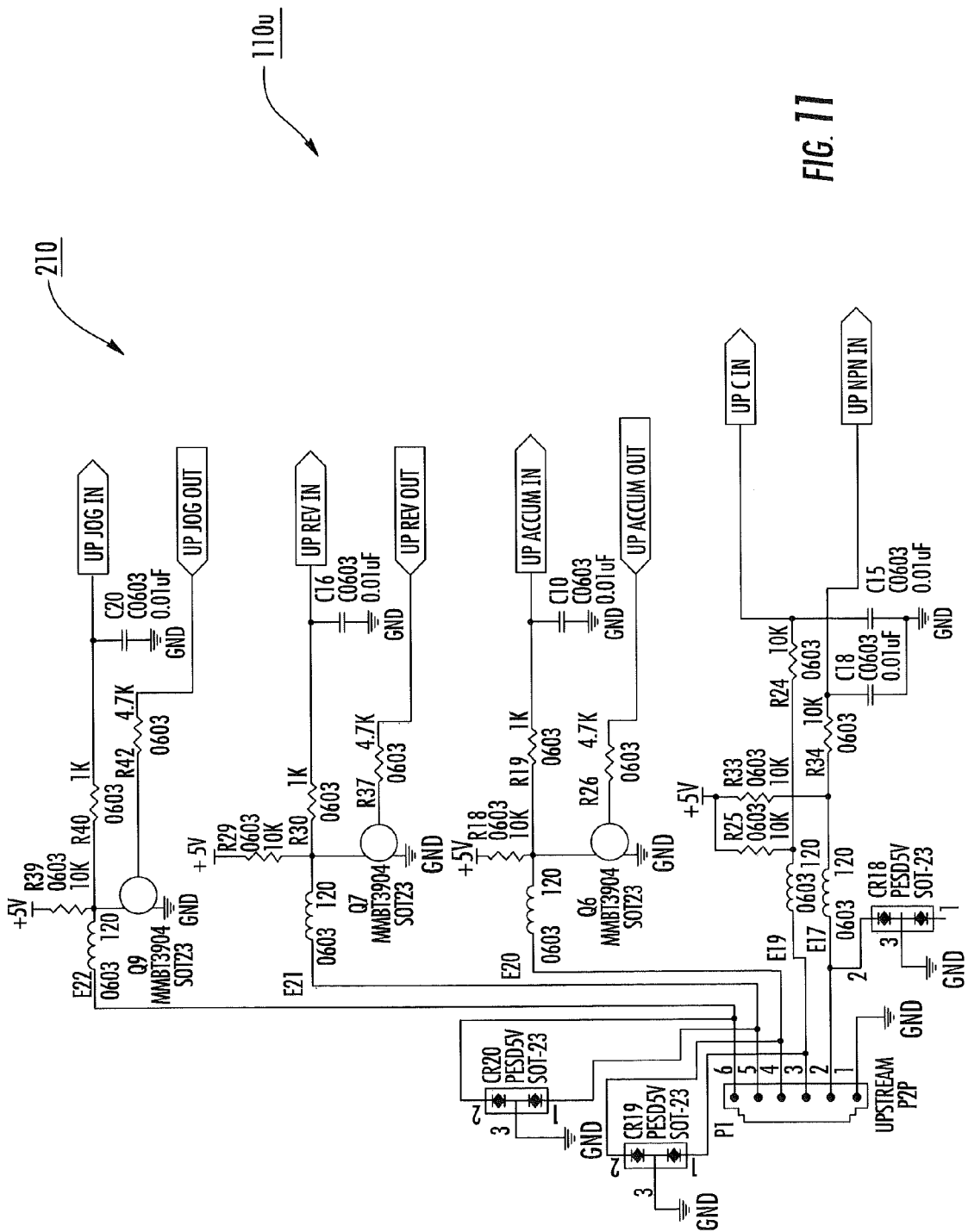
FIG. 11 is a diagram of an upstream peer-to-peer controller according to embodiments of the present invention.
Figure 12:
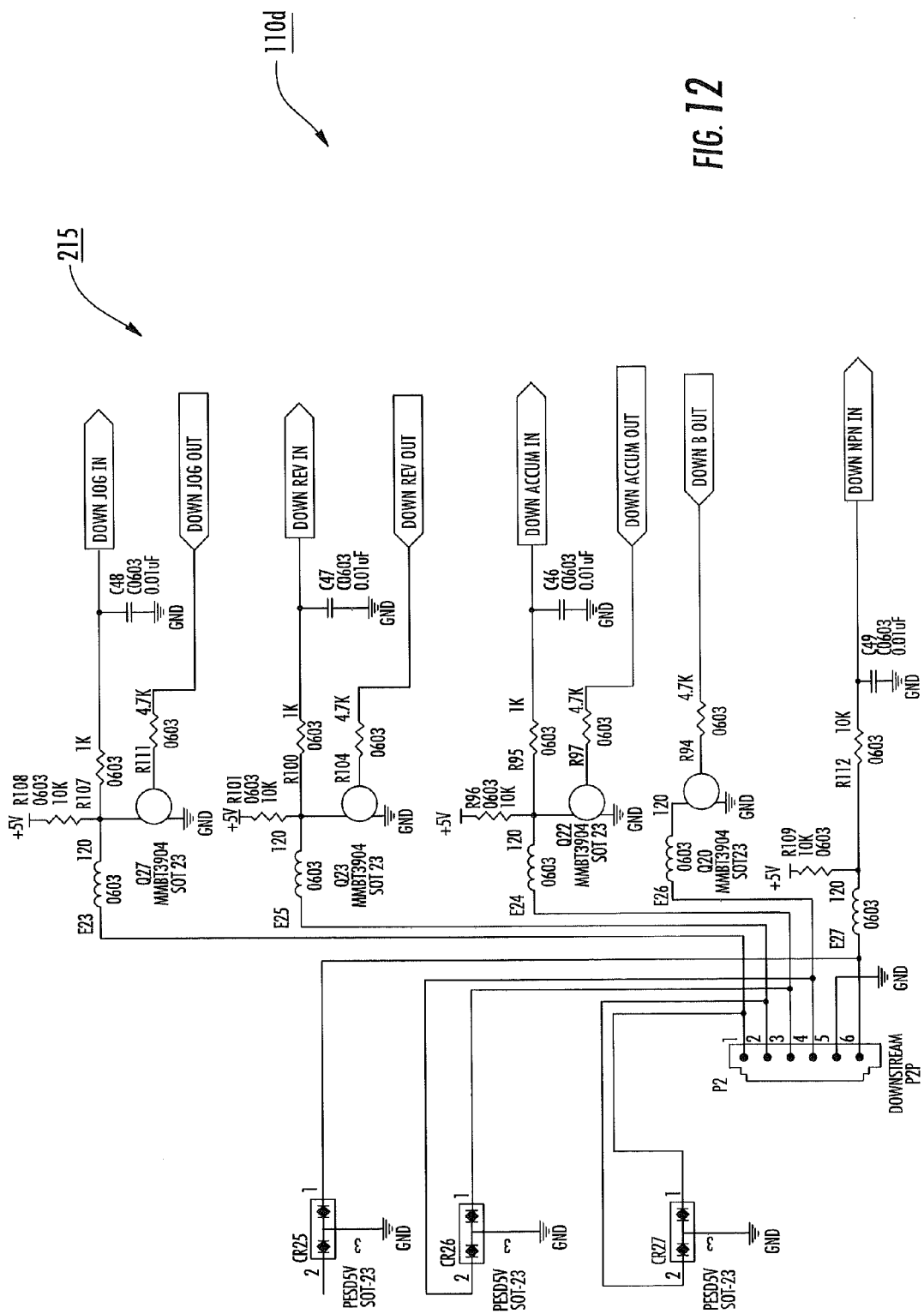
FIG. 12 is a diagram of a downstream peer-to-peer controller according to embodiments of the present invention.
Figure 13:
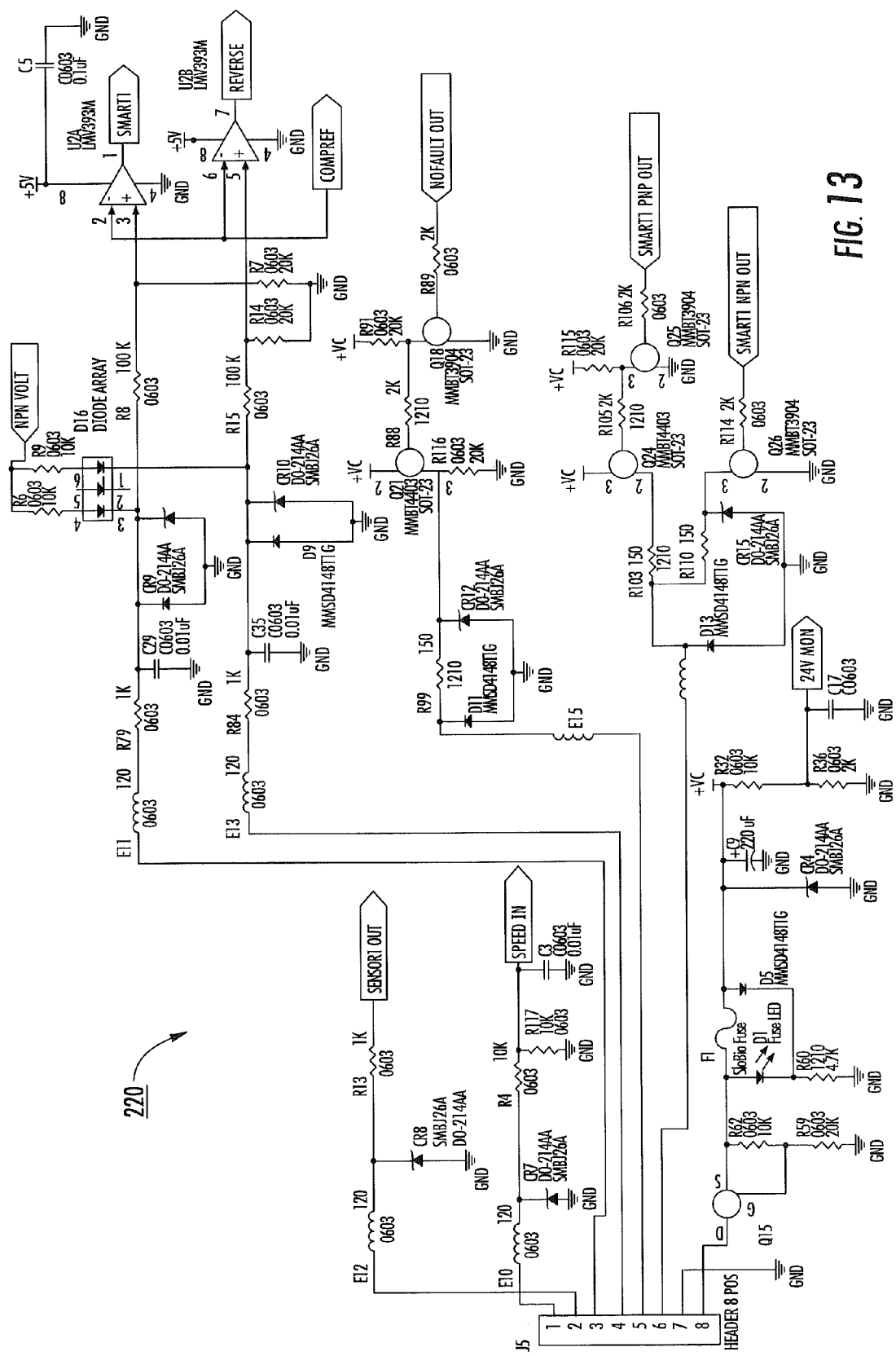
FIG. 13 is a diagram of a system control circuit according to embodiments of the present invention.

FIGS. 9-15A are examples of components or sub-circuits of the device 10 according to embodiments of the present invention. FIG. 9 illustrates an example of a sensor interface circuit 200 for sensor paths 30p (FIG. 1). FIG. 10 illustrates an exemplary 5V power supply circuit 205 for the device 10. FIG. 11 illustrates an exemplary upstream peer-to-peer interface circuit 210 for the device 10 while FIG. 12 illustrates an example of a for a downstream peer-to-peer interface circuit 215 110d (FIG. 1). FIG. 13 is an example of a circuit diagram of a system control circuit 220 for the device 10. FIG. 14 is an example of a motor control circuit 225 for the controller device 10. FIG. 15A is an example of a main processor unit circuit 240 for the device 10 (FIG. 1).

The control device 10 can include the following product functions.

Motor Control

1) When an OBT begins to enter into a zone, the software will turn on that zones motor.
2) Runs motor in forward or reverse direction depending on direction input
3) Software will also monitor current draw of motor over time, and use Temperature Model algorithm to determine temperature of the motor
4) Board temp is also monitored, will alter current to motor based on certain criteria
5) The onboard rotary switch and Speed In input will be monitored to know when and how much to adjust the speed of the motor
6) Monitor Hall Effect Sensors to monitor current speed and direction against expected speed and direction and dynamically adjusts accordingly.

ZPA Functionality

Standard Singulation 1) handles the control of zones to keep OBTs a certain distance apart, thus distributing a more uniform load across the motors. Also decreases the chance of OBT jams.
2) Software uses the Peer-to-Peer ports to communicate with adjacent zones upstream and downstream. This allows the software to make decisions based on inputs of the adjacent zones.
3) Monitors L-stop input to detect when a user is manually stopping a zone so that it can alert other zones to this event, so they may respond to this action accordingly.
4) Monitors Sensor 1 to detect the presence an OBT on the downstream edge of a zone. Then the software will check to see if it is ok for the OBT to enter the next zone through the Peer-to-Peer. It will also check to see if the upstream is active. If it is active the same time as the zone's sensor then it must handle the oversized OBT.
5) Monitors Sensor 1 of the upstream zone, to know when a new OBT is ready to enter into its zone. Will check to see if an OBT has currently entered the zone. If it has then it will tell the upstream to accumulate the package till the previous OBT has completely left its zone.
6) Monitors for Jog command, if the jog command is received anytime during singulation, then all sensor inputs are ignored, and the motors are blindly ran.
7) If the zones are ran in reverse, then current zone's sensor becomes the upstream zone, and the previous upstream sensor will then become the downstream sensor.
8) Check and monitor for Jams. If an OBT does not reach the sensor after a predetermined distance count, then a Jam Type 1 has occurred. If a Jam occurs at the sensor then a Jam Type 2 occurs. Jam Type 2 is time based, a package should clear the downstream sensor after a preset time. If it does not then a Jam is detected and the Fault LED is lit steady until the Jam is clear.

Enhanced Singulation

1) Instead of waiting for an OBT to completely clear out of a zone before allowing the next one in, Enhanced Singulation allows the next OBT to enter once the previous OBT starts exiting the zone. This allows a greater throughput but also increases the chance of a Jam occurring.

Jbug

1) Allows a user to read/write to SRAM and EEPROM for debugging or changing parameters.

Warning/Fault outputs

1) Handles the LED output for specific warning or fault conditions, so a user may quickly be able to diagnose an issue.

Thermal Model

1) The thermal model can run in defined cycles, such as once per second, and calculates the expected temperature (rise) of the motor.
2) uses model coef 1-6 and measured current over time to determine the motor temperature.
3) model coef5 is the decay timer in seconds for the case temperature, it divides the case temp by 256 each time the tinier elapses.
4) model coef6 is used to scale the current measurement into 0.1 A units
5) model coef1 is used to scale current to take into account for winding resistance
6) if the motor is below 70% of target speed then it is deemed slow. A flag is raised to let the model know to use model coef2 to scale the current further to take into account the increased heat generated due to the slow condition.
7) if the motor is stalled then the current is scaled further with model coef3
8) the current is then squared and then sum in result with the case temp.
9) then sum in ((Vmon*I)/64*model coef4)/256

The controller device 10 can work independent of user interaction for normal operation. Typically, the only user interaction occurs during installation of the conveyor system and maintenance. The controller device 10 can include one or more of the below defined parameter assumptions and functions.

A motor can be considered stalled when under a selectable parameter for ~125 mS

A motor can be considered slowed when under a selectable parameter for ~125 mS

The thermal model can update the expected case temperature about every one (1) second.

Decelerating OBT before braking when the accumulate signal is received to take at most about 1 second.

For initial startup of zones, the downstream zone can perform one full revolution before the upstream starts sending an OBT. This will help minimize power spikes from zones starting simultaneously.

An example of a thermal model is provided below.

| Model Coefficients | E/G |
|---|---|
| Coef1—phase resistance | 153/142 |
| Coef2—current scaler for motor in slow state | 222/234 |
| Coef3—current scaler for motor in stalled state | 234/245 |
| Coef4—gearbox losses and thermal cap | 18/16 |
| Coef5—Time period in seconds to decay temp | 8 |
| Coef6—scales current into .1A units | 159 |

Temperature Model Algorithm

CaseTemp=CaseTemp+($I^2$/256)+($V*I$/64)*(model_coef4/256)

Decay Case Temp caseTemp=caseTemp−(caseTemp/256)//when timer set by model_coef5=0

The current can be scaled depending on certain conditions and used in the algorithm above.
Scale Current to 0.1 A Units
Read Current value
($I$*model_coef6)/128//scales current to 0.1 A units
Store the result into R16
Scale Factor for Winding Resistance
($I$*model_coef1)/128
Current Due to Negative Current
Check result to see if current is negative
   If it is then I=0
Current Due to Dynamic Braking
Check to see if motor is dynamic braking
   if it is then I=0
save a copy of R16 (the current scaled to 0.1 A units)
Calculate and Sum in Thermal Rise
($I$*model_coef1)/128//scale factor for winding resistance
   If motor in slow state
      Scale the current//($I$*model_coef2)/128
   if motor in a stalled state
      Scale the current//($I$*model_coef3)/128
caseTemp+=$I\hat{\ }b$ 2/256
Completes Case Temperature Calculation
caseTemp+=($V*I$/64)*(model_coef4/256)
//I above is current scaled by model_coef6

It is contemplated that a Case Temperature Thermistor may be added in the future to more precisely and/or accurately determine the actual temperature of the motor. The firmware can be modified to handle the new input and change how the thermal model is used.

In some embodiments, the zoned control system 50 allows for five states for a respective zone in standard singulation and nine states in enhanced singulation. These states are summarized below and the cited figures show exemplary operations that may be used during these states. However, it is noted that other steps can be used to carry out the functionality of the states.

Transport Zone with Standard Singulation

Figure 16:
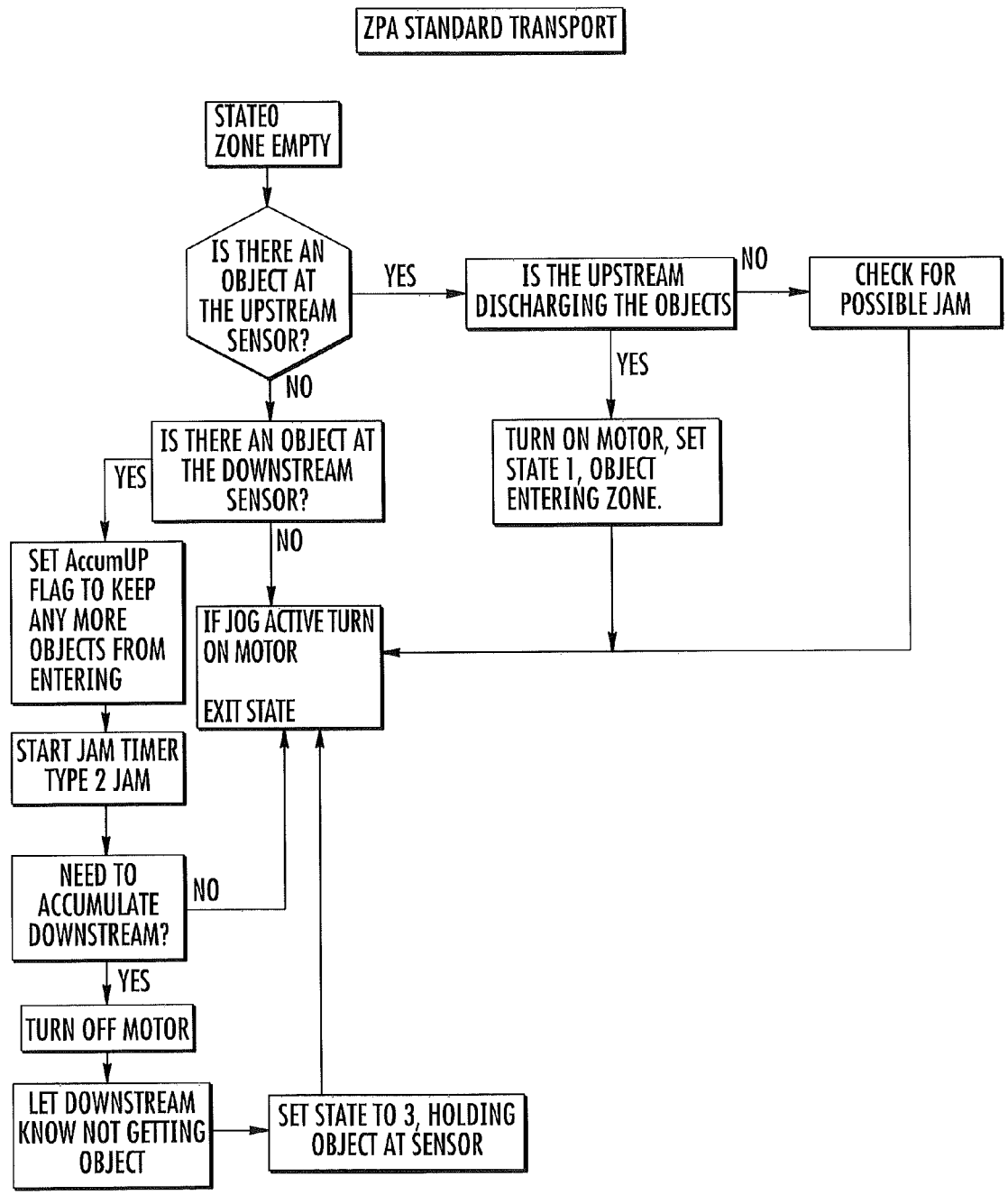
FIGS. 16-20 are flow charts of exemplary operations for each of five states for a transport zone with standard singulation according to embodiments of the present invention.
Figure 17:
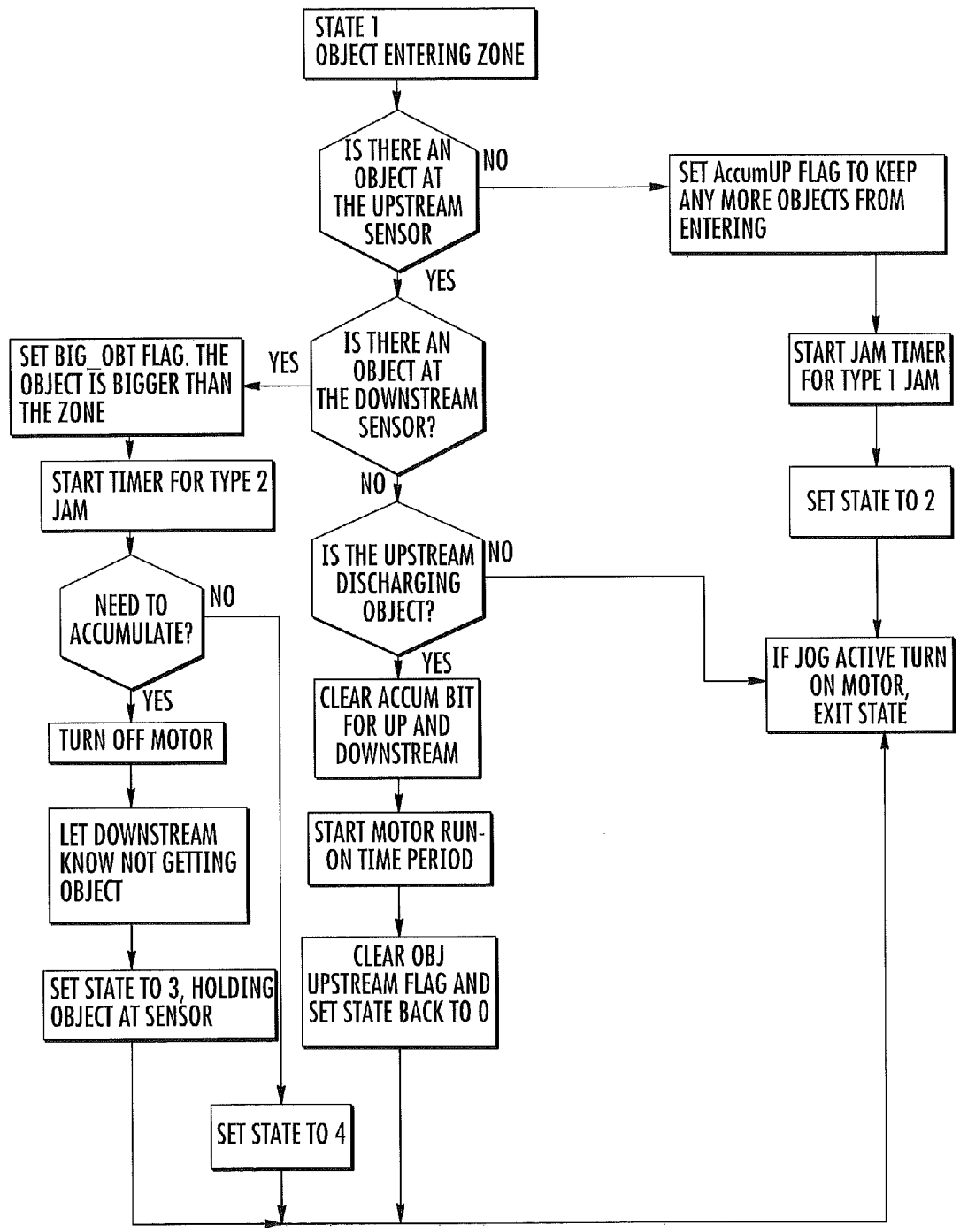
Figure 18:
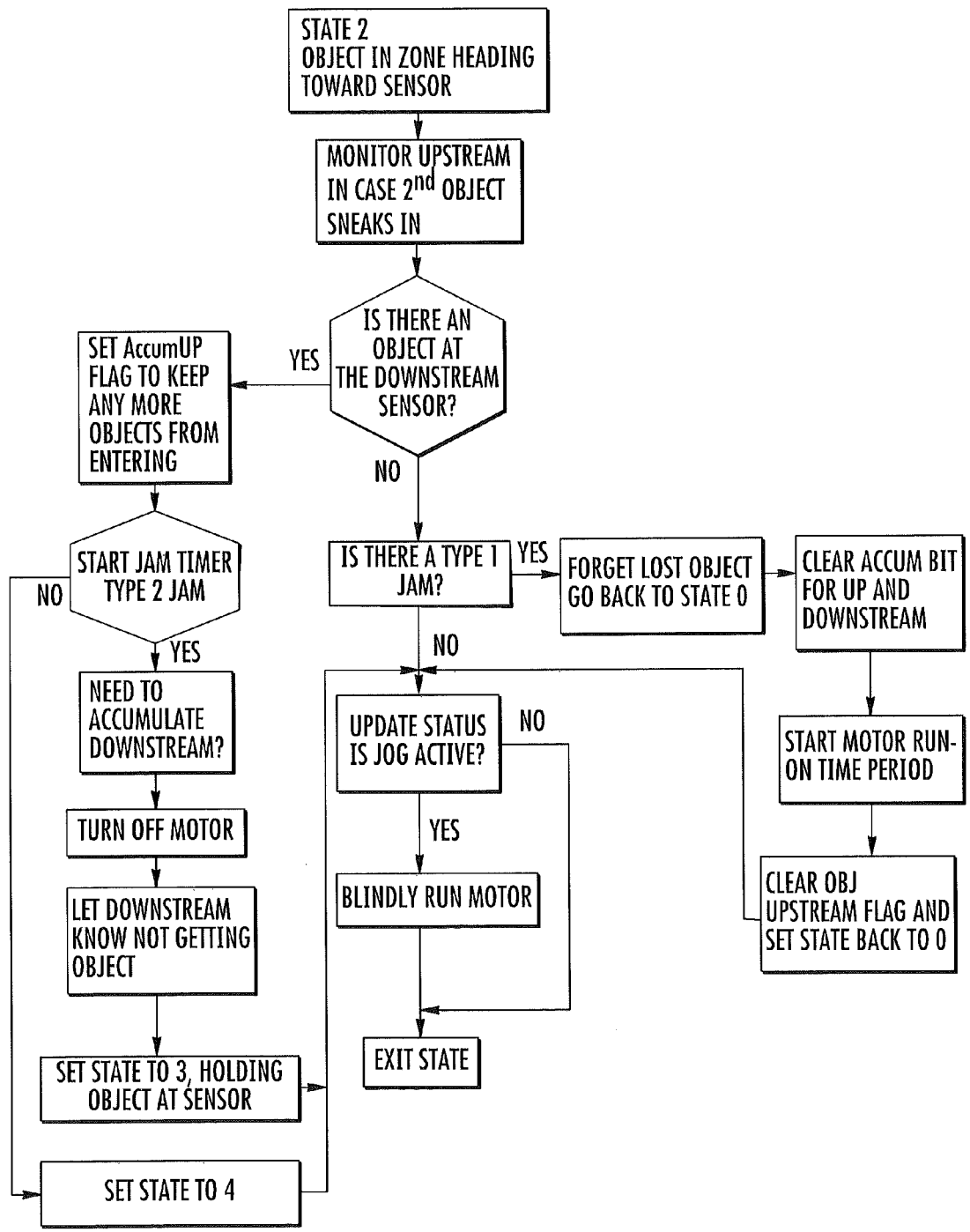
Figure 19:
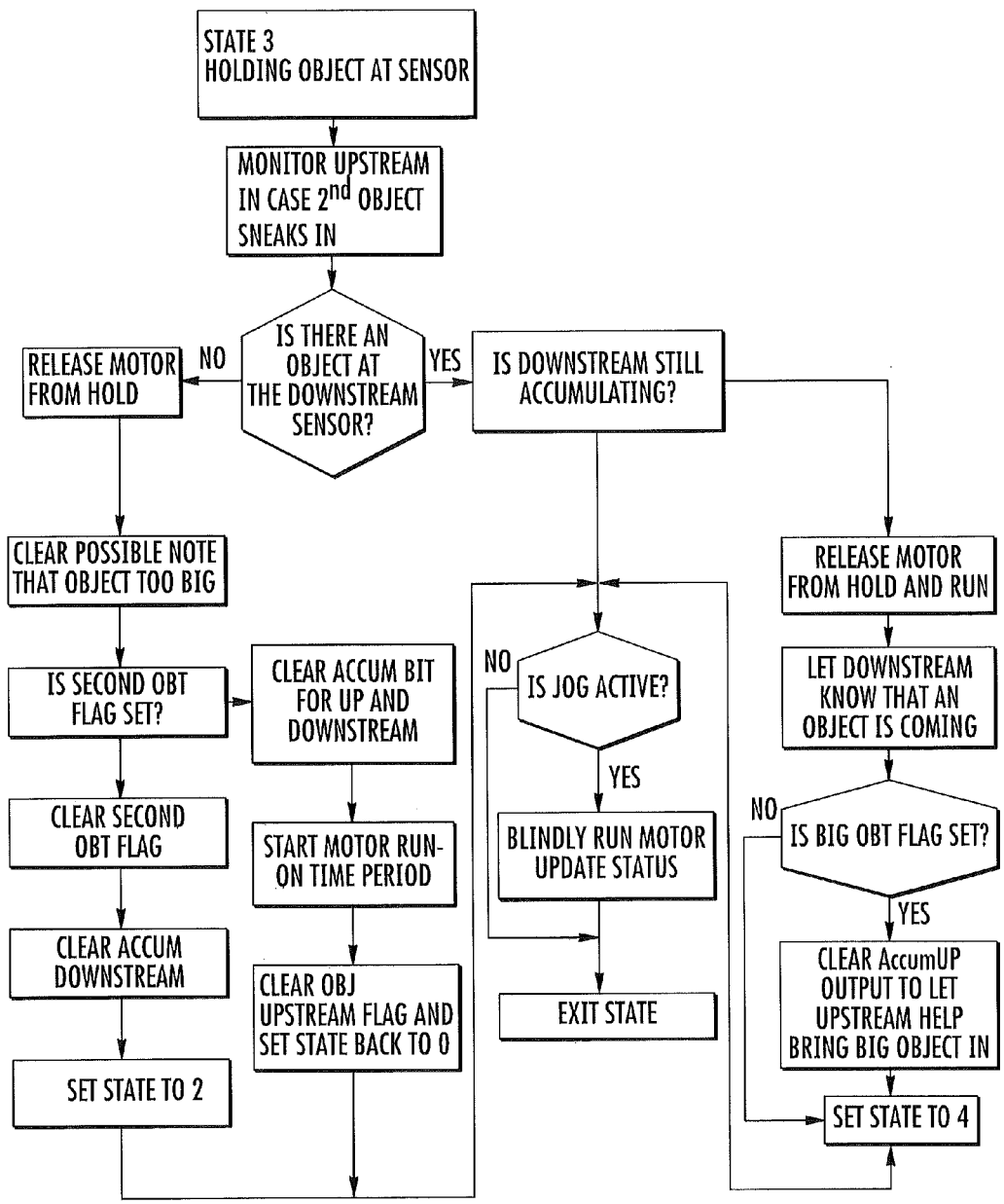
Figure 20:
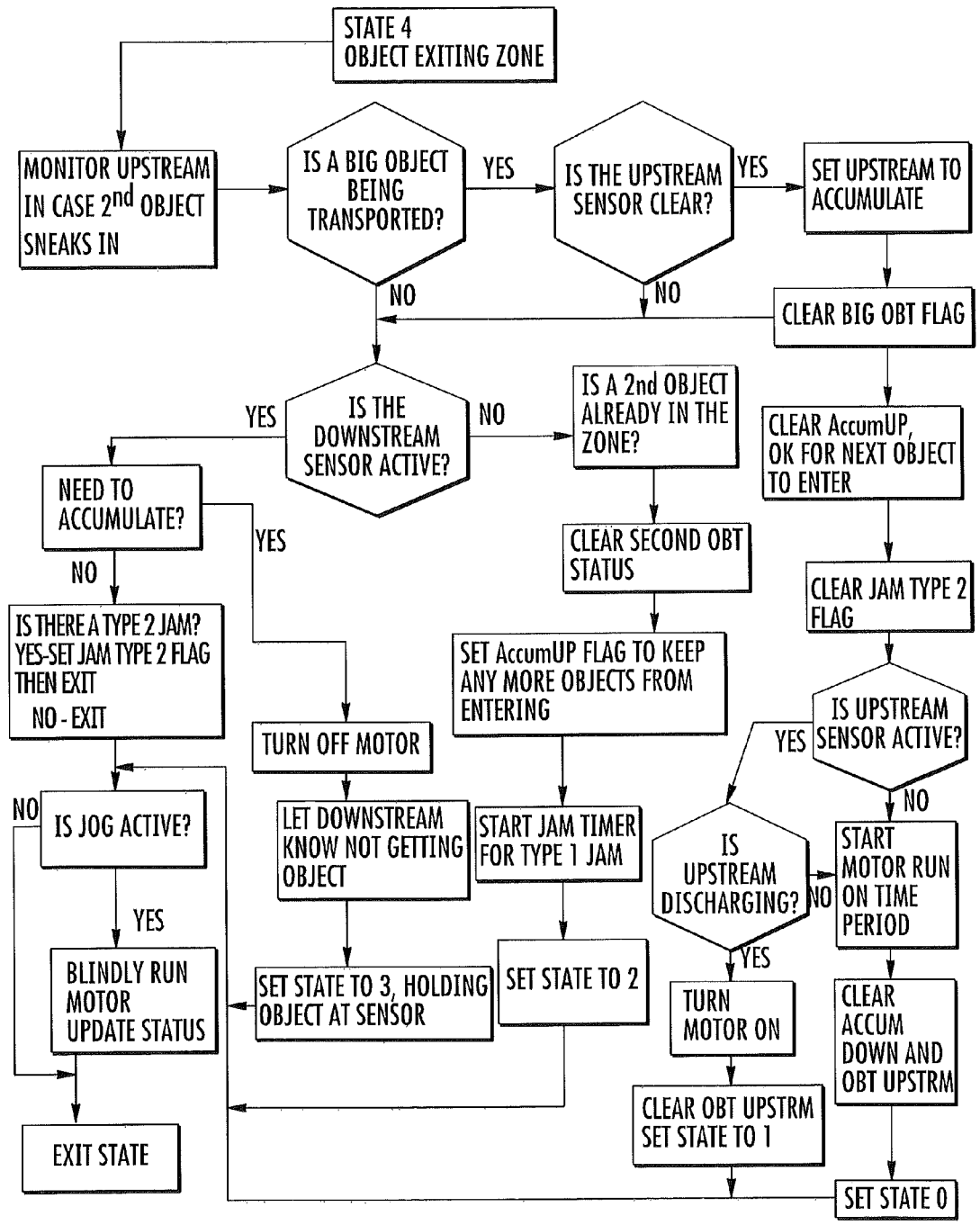

5 States
0. Zone empty (see FIG. 16 for exemplary operations)
1. Object entering zone (see FIG. 17 for exemplary operations)
2. Object in zone heading toward sensor (see FIG. 18 for exemplary operations)
3. Holding object at sensor (see FIG. 19 for exemplary operations)
4. Object exiting Zone (see FIG. 20 for exemplary operations)

Transport Zone with Enhanced Singulation

Figure 21:
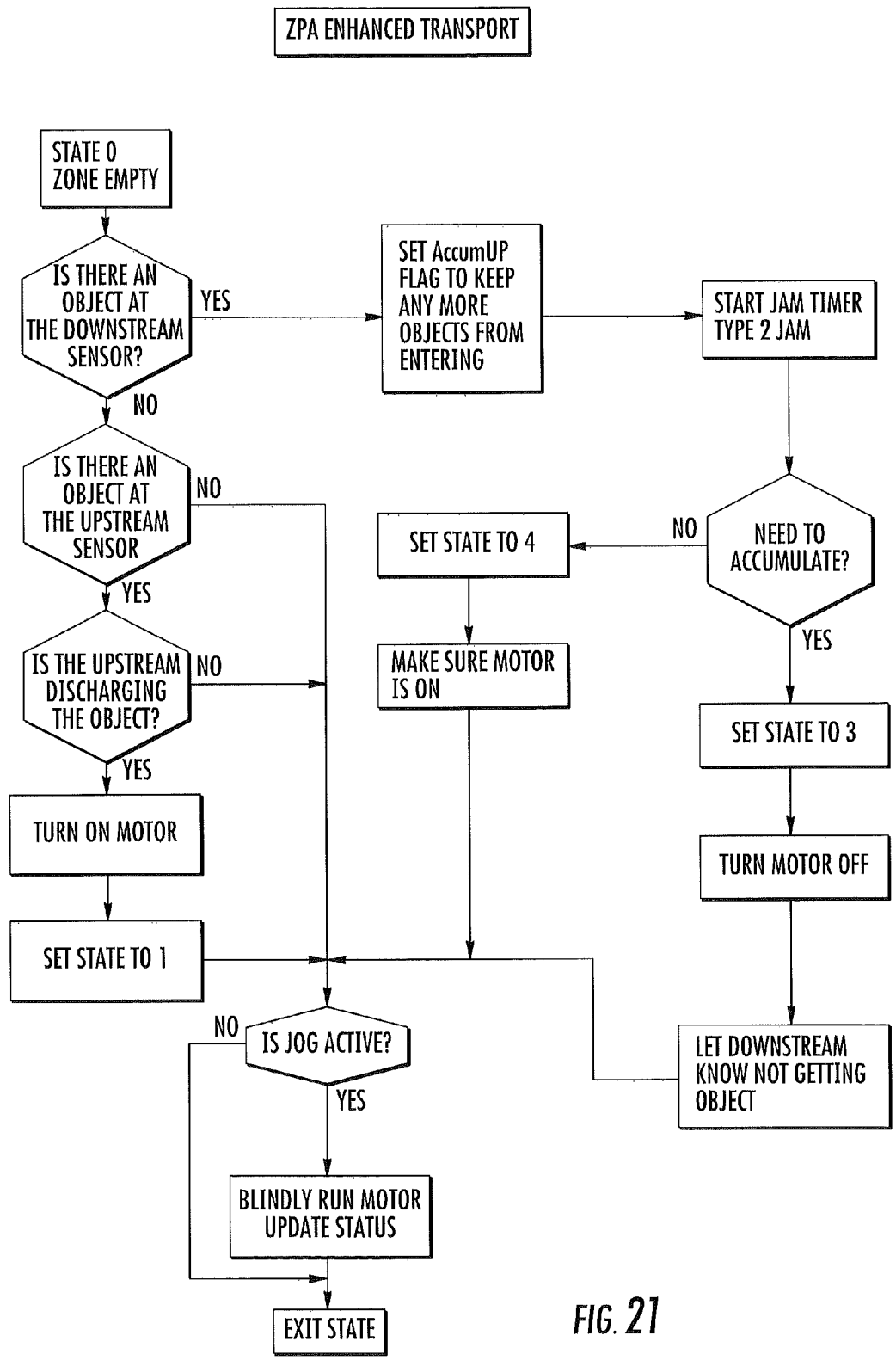
FIGS. 21-29 are flow charts of exemplary operations for each of nine states for a transport zone with enhanced singulation according to embodiments of the present invention.
Figure 22:
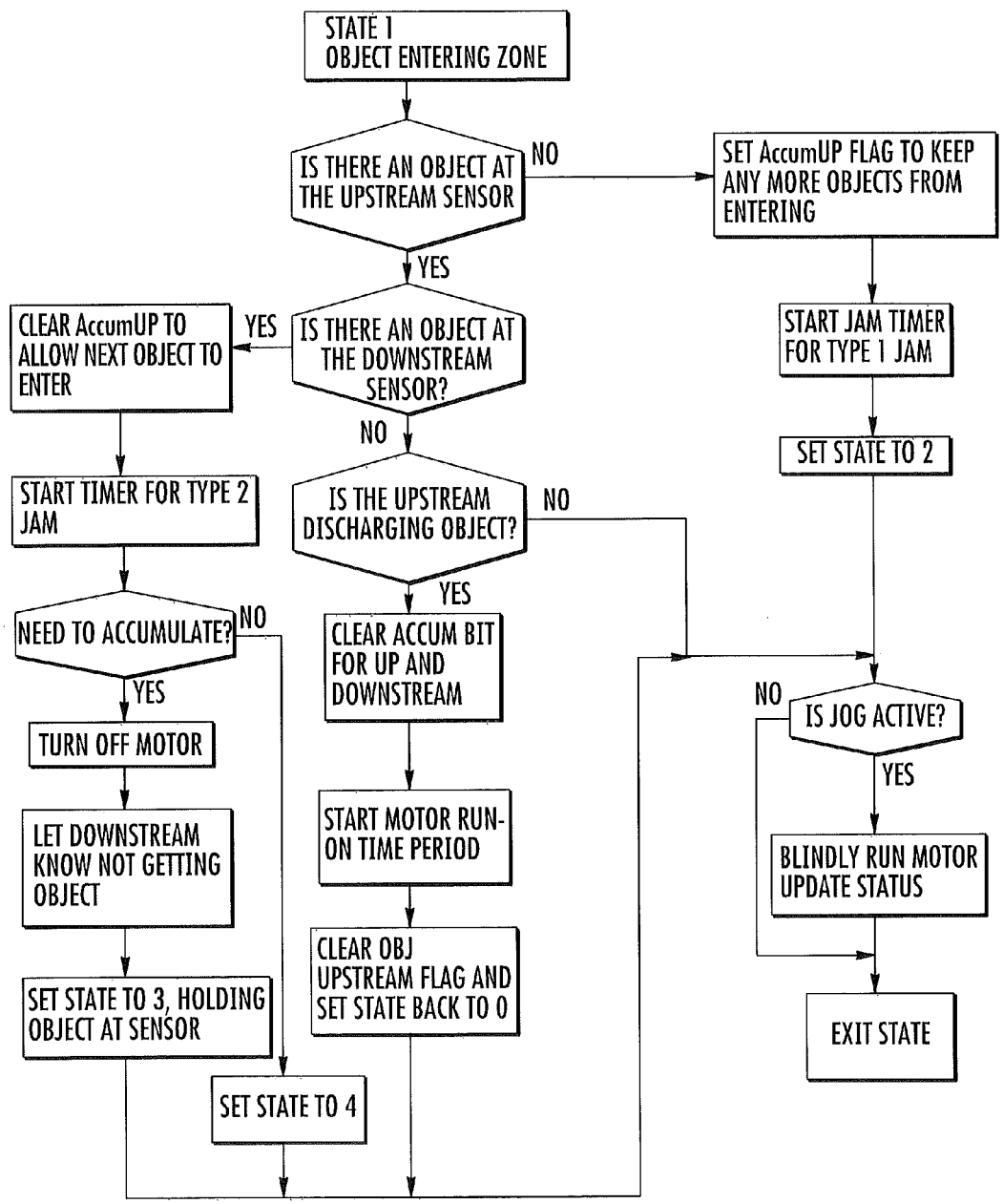
Figure 23:
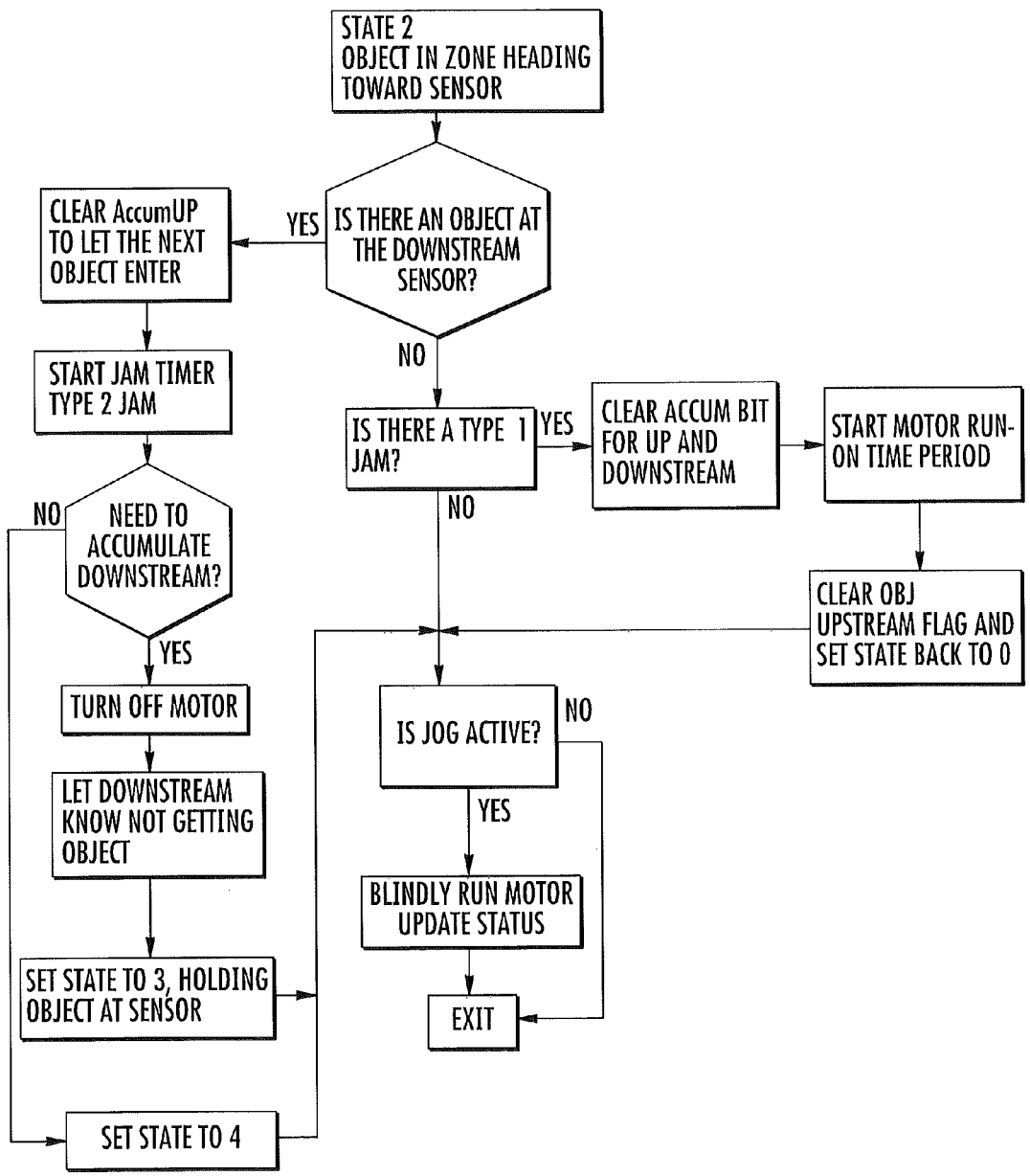
Figure 24:
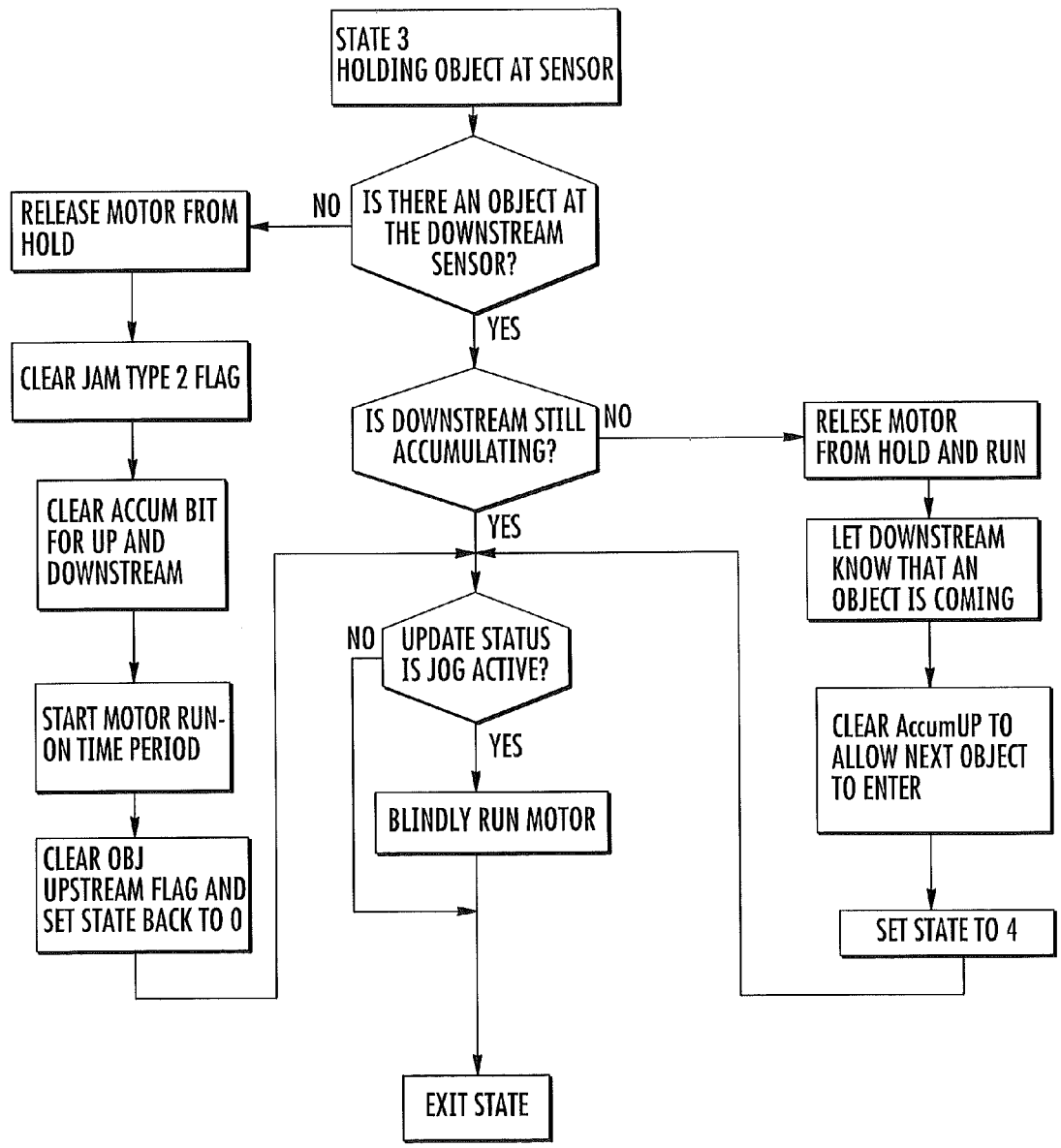
Figure 25:
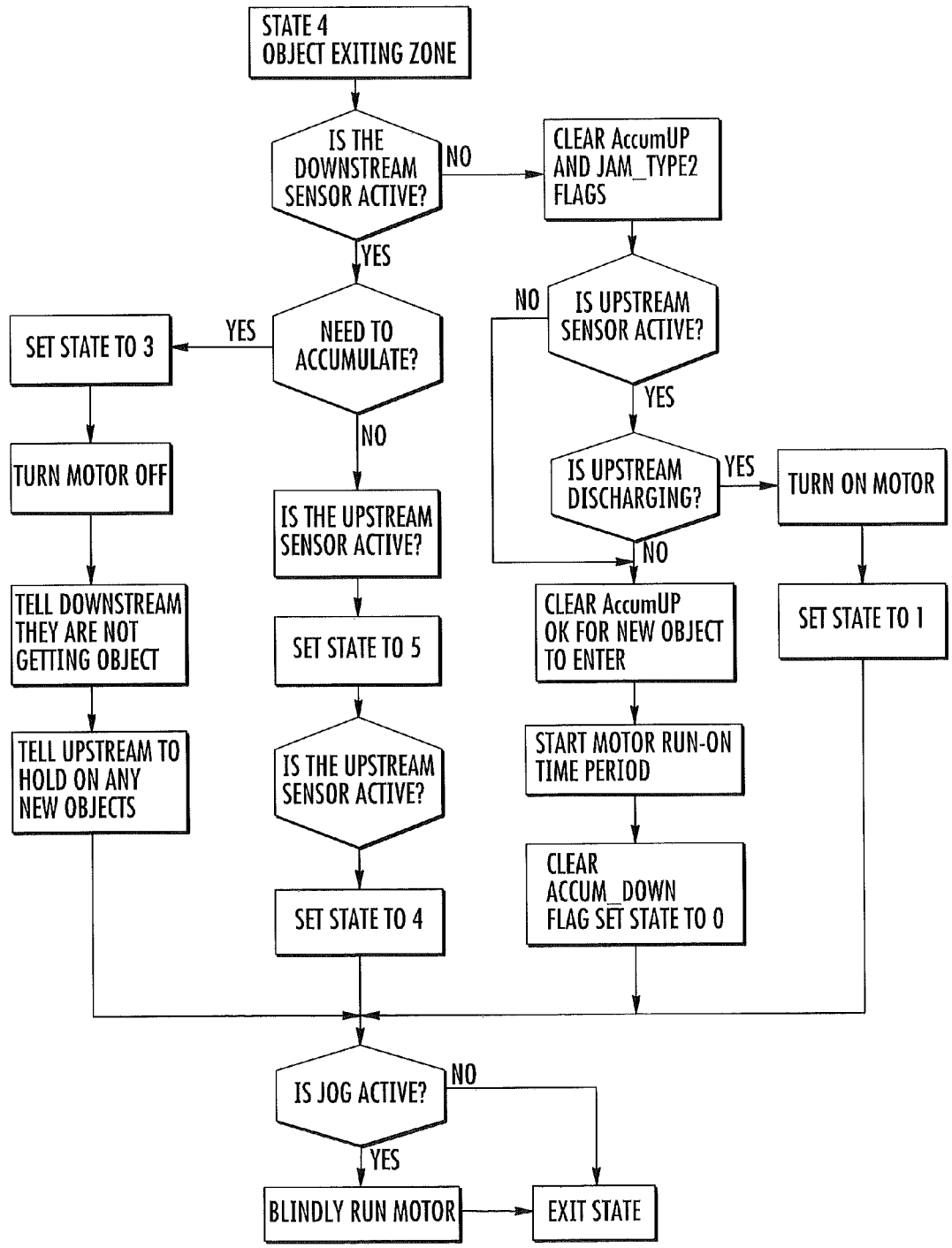
Figure 26:
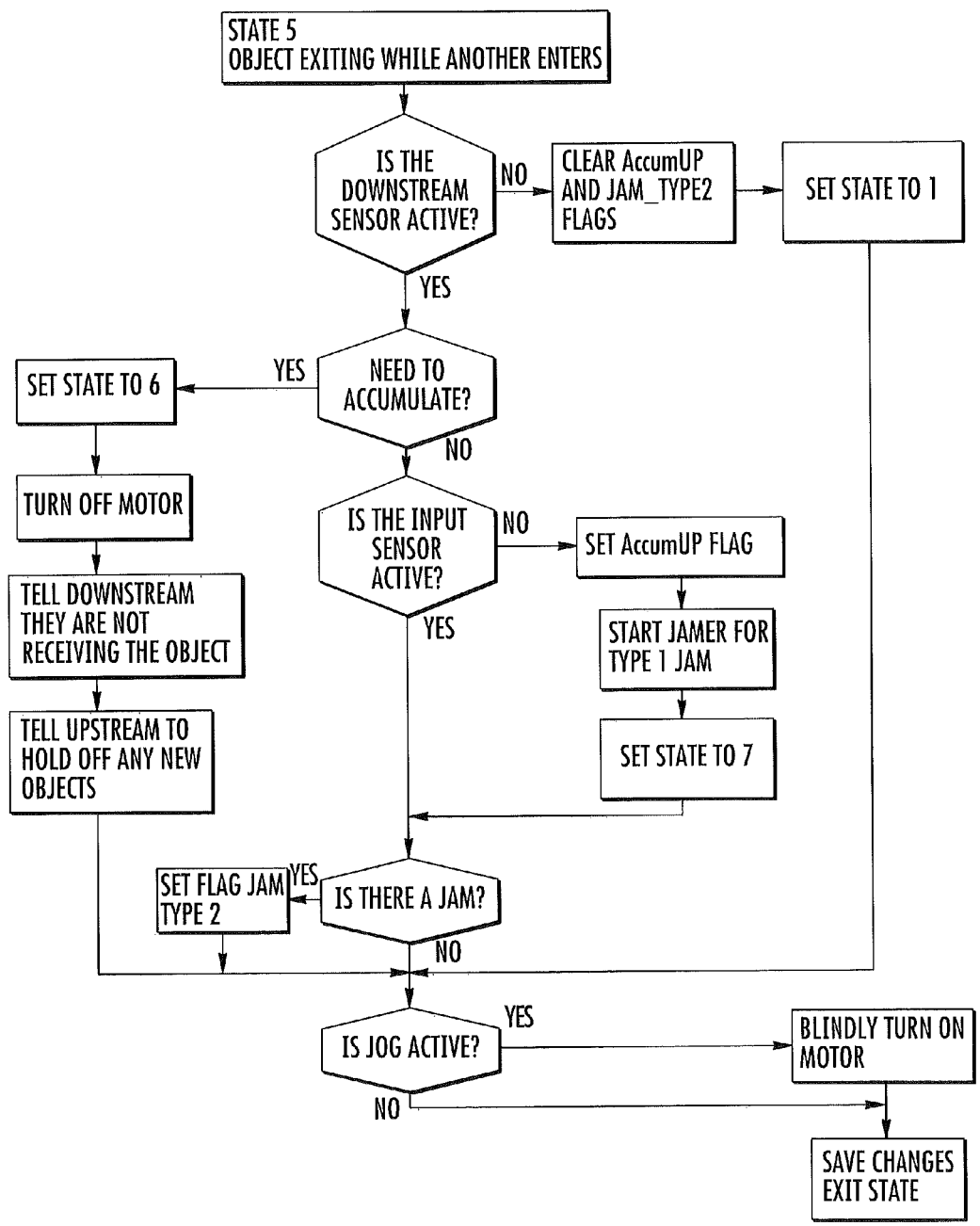
Figure 27:
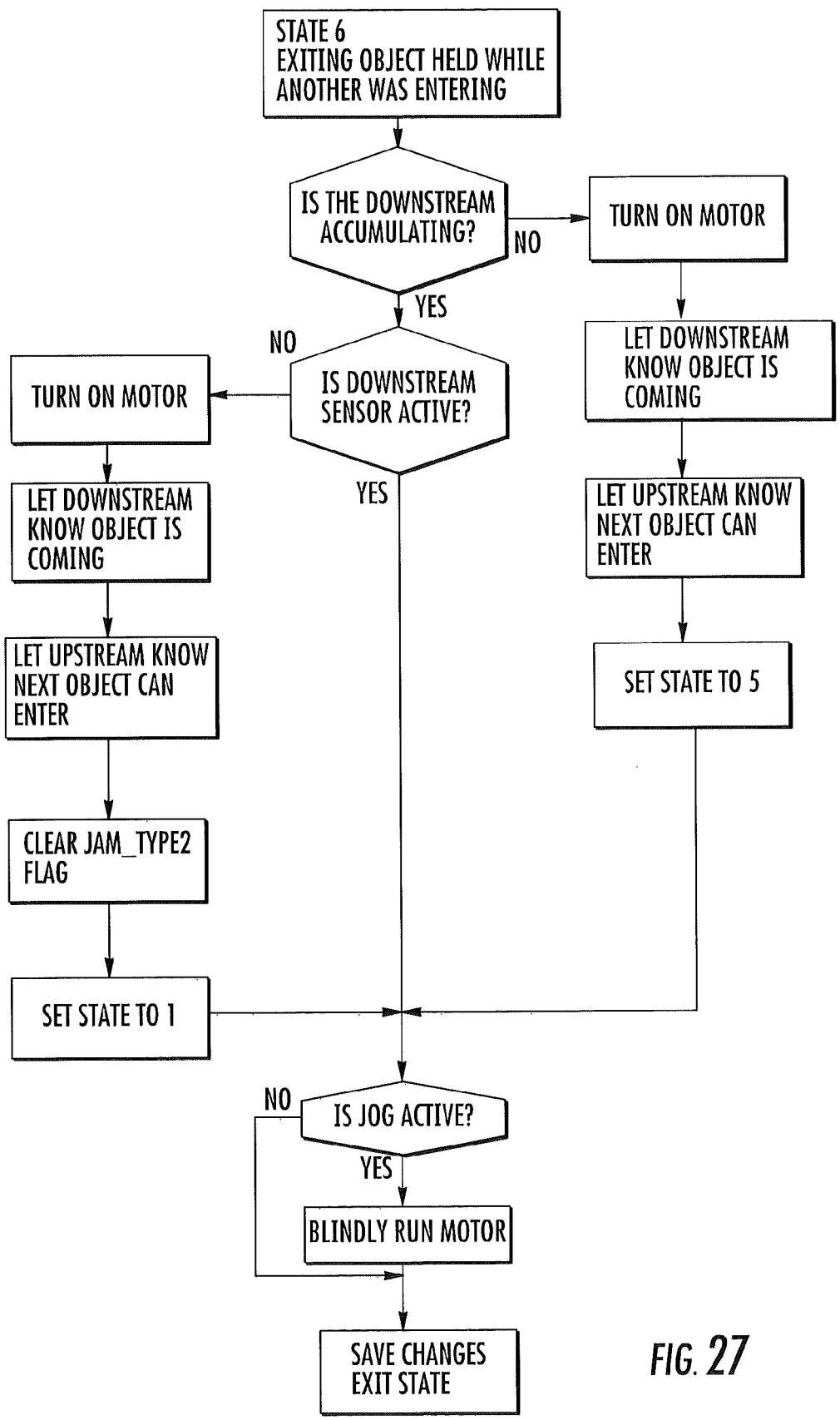
Figure 28:
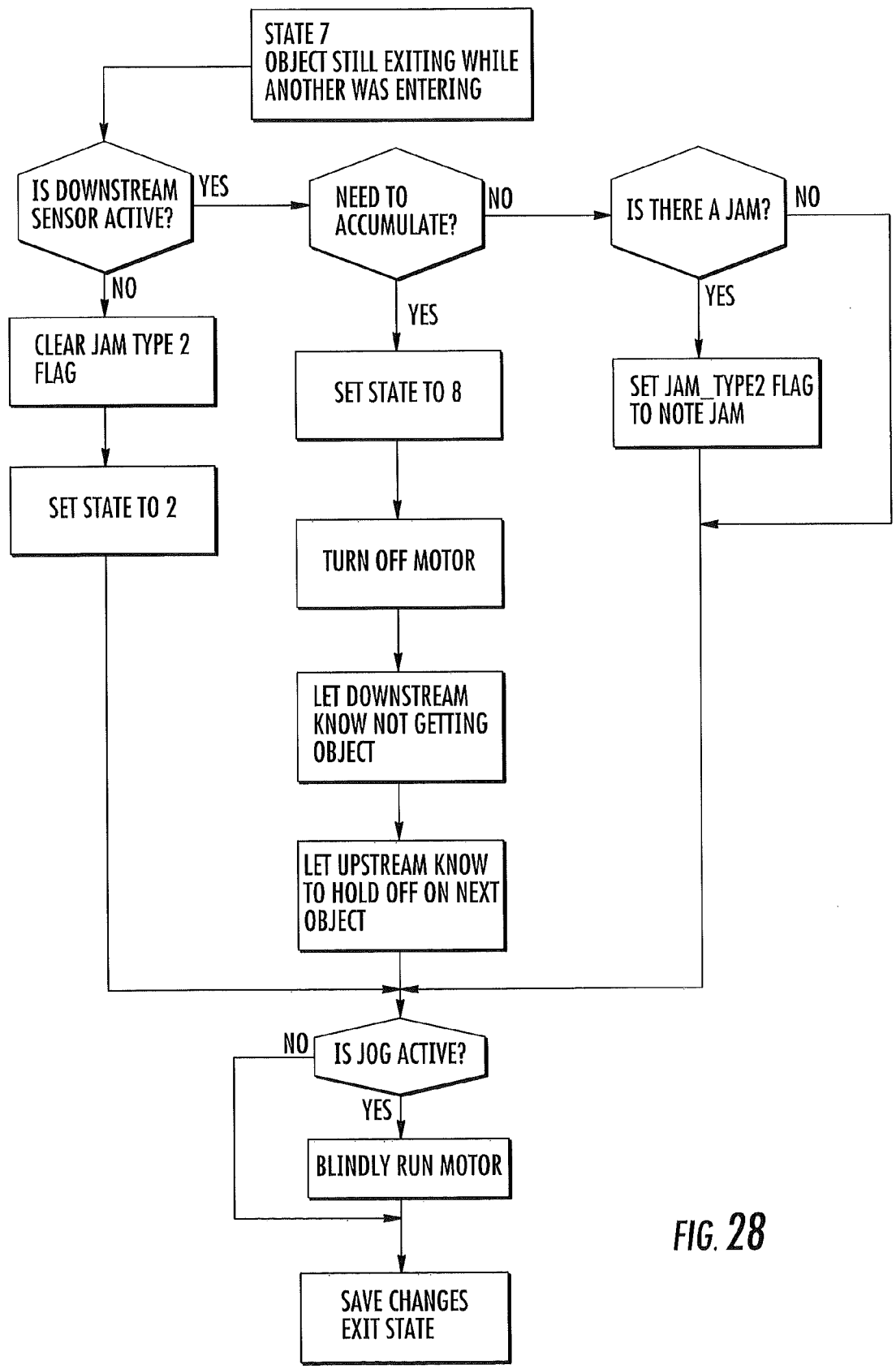
Figure 29:
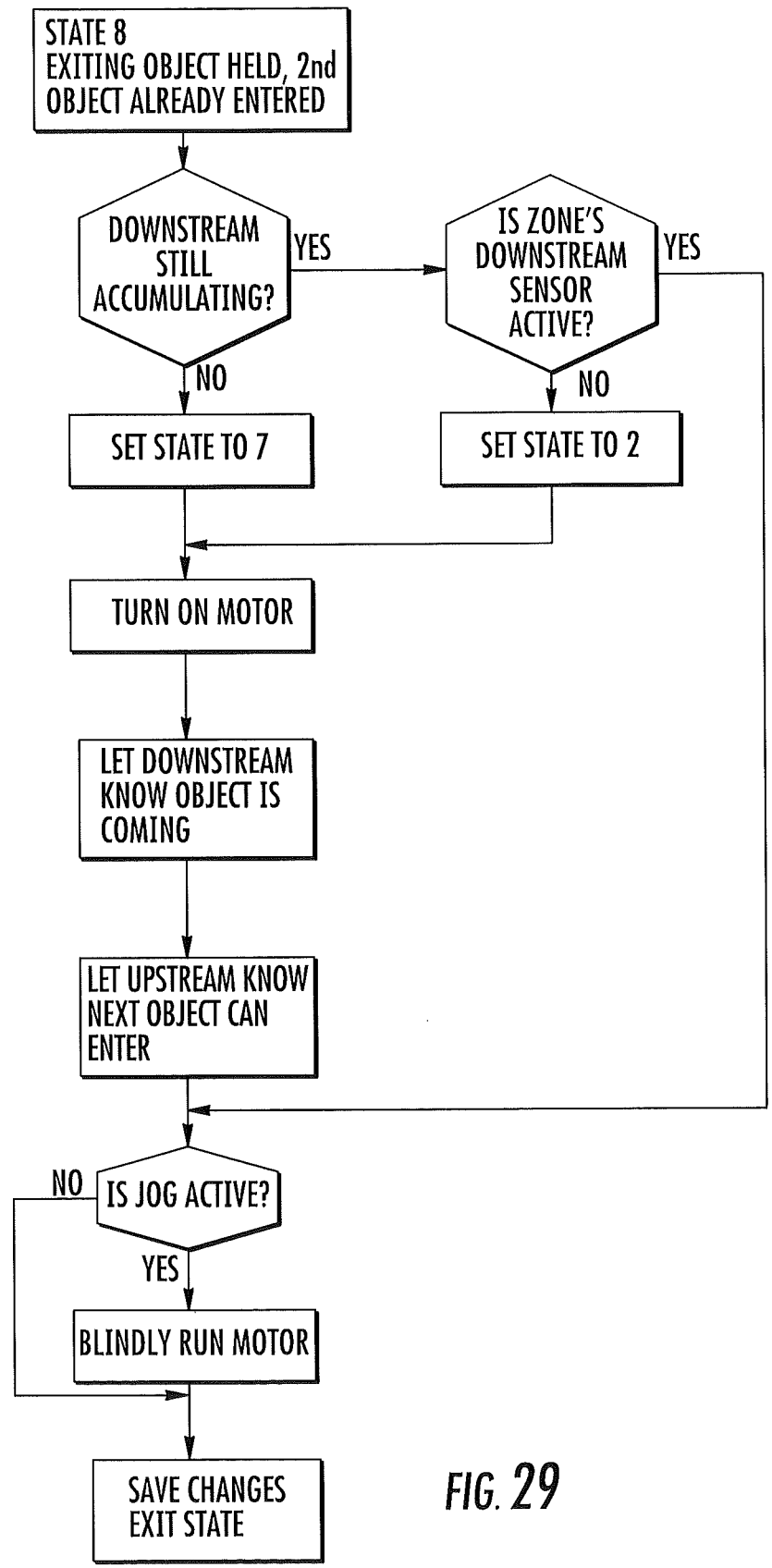

9 States
0. Zone empty (see FIG. 21 for exemplary operations)
1. Object entering zone (see FIG. 22 for exemplary operations)
2. Object in zone heading toward sensor (see FIG. 23 for exemplary operations)
3. Holding object at sensor (see FIG. 24 for exemplary operations)
4. Object exiting Zone (see FIG. 25 for exemplary operations)
5. Object exiting while another enters (see FIG. 26 for exemplary operations)
6. Exiting object held, another was entering (see FIG. 27 for exemplary operations)
7. Object still exiting, $2^{nd}$ object already entered (see FIG. 28 for exemplary operations)
8. Exiting object held, $2^{nd}$ object already entered (see FIG. 29 for exemplary operations)

The device 10 (e.g., controller card) can be configured so that singulation mode is selected by sw3 on the dip switch (0 for enhanced, 1 for standard)

Figure 30:
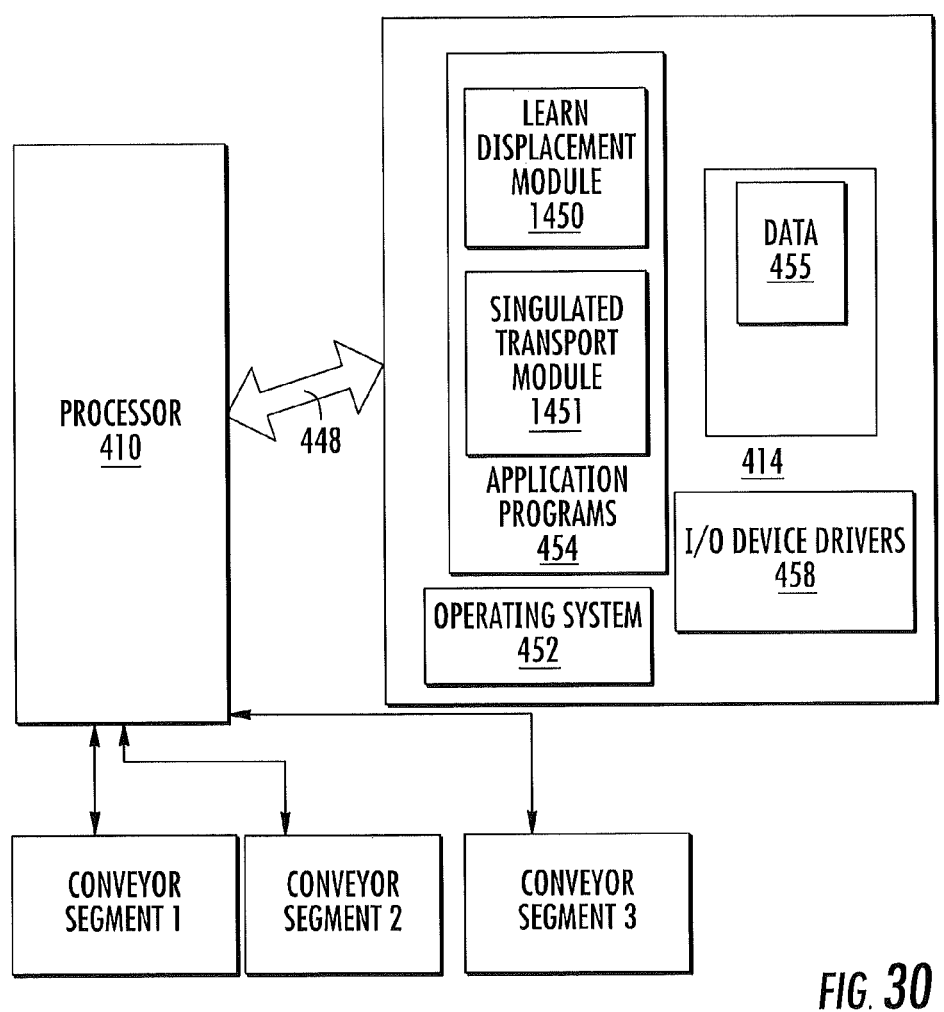
FIG. 30 is a schematic illustration of a data processing system illustrating a Learn Displacement Mode according to embodiments of the present invention.

FIG. 30 illustrates a circuit similar to that discussed above with respect to FIG. 5. However, this circuit includes a Singulated Transport Module 1451 and a Learn Displacement Module 1450 for a conveyor zone (100-103, FIGS. 2-4) to electronically learn a distance associated with a number of revolutions as discussed above.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, if used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A zoned conveyor system for transporting a series of loads, comprising:
   a series of conveyor zones including a downstream conveyor zone and a plurality of upstream conveyor zones, each conveyor zone including at least one drive motor for operating each respective conveyor zone to advance the loads along the conveyor system; and
   a control circuit in communication with each conveyor zone at least one drive motor,
   wherein the control circuit is configured to monitor during start-up for a respective conveyor zone at least one of: (i) current draw and speed of a respective drive motor as the motor goes from an unpowered state to an operational state; or (ii) a number of revolutions of a respective drive motor as the motor goes from an unpowered state to an operational state, and wherein the control circuit is configured, after operation of the upstream and the downstream conveyor zones are stopped to maintain stationary any loads carried by the upstream and downstream conveyor zones, to resume operation of the upstream and downstream conveyor zones by first initiating operation of the downstream conveyor zone, and subsequently sequentially controlling initiation of operation of each upstream conveyor zone, wherein the control circuit is configured to initiate operation of one of the upstream conveyor zones based on one of the following: (i) when the drive motor of the conveyor zone downstream therefrom reaches a defined current draw and speed; or (ii) when the drive motor of the conveyor zone downstream therefrom has reached a defined number of rotations, so that operation of each conveyor zone is initiated in a controlled sequential manner in response to when the drive motor of the conveyor zone downstream therefrom reaches the defined current draw and speed or the motor has turned the defined number of revolutions.

2. The system of claim 1, wherein the control circuit is configured to increase power to a respective drive motor at a constant rate of change from the unpowered state to the operational state, and wherein the control circuit is configured to direct the sequential operation using the monitored current draw and speed of a respective drive motor.

3. The system of claim 1, wherein the drive motors each include at least one integral Hall-effect sensor, and wherein the control circuit is configured to direct the sequential operation based on motor revolution count using a pulse count detected by the respective Hall-effect sensors.

4. The system of claim 1, wherein the control circuit is configured to ramp up at least one of the zones at a different speed from other zones to thereby operate with improved power management and a smooth system ramp-up.

5. The system of claim 1, wherein the control circuit comprises a primary controller card that communicates with drive motor controller cards at upstream and downstream conveyor zones, wherein the primary controller card includes an onboard processor that includes the sequential start-up logic and current draw and speed threshold values used to determine when to initiate start-up to the different zones.

6. The system of claim 1, wherein the control circuit is configured to operate with conveyor zones having different ratio gear boxes with each respective gear box ratio associated with a different number of rotations or current draw to raise the drive motor and associated zone up to a desired speed.

7. A controller circuit device for a zoned conveyor system, comprising:
a control circuit comprising a sequential release operational mode for a zoned conveyor system having a downstream zone and a plurality of upstream conveyor zones in communication with a drive motor for each conveyor zone, wherein the control circuit is configured to monitor current draw and speed of the respective drive motors during start-up, and wherein, in the sequential release operational mode, the control circuit is configured to initiate operation of the upstream conveyor zones based on when a drive motor of the conveyor zone downstream therefrom reaches a defined current draw and speed so that operation of each conveyor zone is initiated in a controlled sequential manner in response to when the drive motor of the conveyor zone downstream thereof reaches a defined current draw and speed.

8. The device of claim 7, wherein the device is a single controller card that is configured to control start-up of different conveyor zones using different defined current draw thresholds and speeds.

9. The device of claim 7, wherein the device is configured to cooperate with conveyor zones that have different drive motors.

10. The device of claim 7, wherein the device comprises a motor temperature monitoring circuit that uses a predictive thermal model that considers whether a motor is associated with a zone using dynamic braking.

11. The device of claim 7, wherein the device has a motor control circuit with a plurality of low side and high side FETs in communication with at least one drive motor of at least one conveyor zone, and wherein during no-load stops the low side FETs are turned on to reduce overshoot during the no-load stops.

12. The device of claim 7, further comprising a look-up table of drive motors, gear ratios and associated threshold values for speed and current draw used for the sequential release mode.

13. The device of claim 7, wherein the control circuit is configured to direct a respective drive motor to ramp up to speed at a constant ramp up rate.

14. The device of claim 7, wherein the control circuit is configured to direct different conveyor zones to ramp up at different speeds while monitoring current draw.

15. The device of claim 7, wherein the control circuit is configured to direct a first upstream conveyor to initiate operation based on first current draw level, and direct a second upstream conveyor to initiate operation based on a different second current draw level.

16. A method of operating a zoned conveyor system, comprising:
stopping operation of a downstream and a plurality of upstream conveyor zones to maintain stationary any loads supported by the conveyor zones; and
automatically re-starting the conveyor zones by sequentially initiating operation of the downstream conveyor zone and the upstream conveyor zones by first initiating operation of the downstream conveyor zone, and subsequently sequentially controlling initiation of operation of each upstream conveyor zone, wherein the re-starting step is carried out by:
monitoring current draw and speed of a drive motor associated with the downstream conveyor zone; then
automatically initiating operation of an adjacent first upstream conveyor zone when the downstream drive motor reaches a predefined current level and speed;
monitoring current draw and speed of a drive motor associated with the first upstream conveyor zone; then
automatically initiating operation of a second upstream conveyor zone adjacent to the first upstream conveyor zone when the drive motor of the first conveyor zone reaches a predefined current draw and speed,
wherein operation of each conveyor zone is initiated in a controlled sequential manner in response to when the drive motor of a conveyor zone downstream thereof reaches a predefined current draw and speed during start-up.

17. The method of claim 16, wherein the predefined current draw and speed for at least one conveyor zone is different from the others.

18. A method of operating a zoned conveyor system, comprising:
   stopping operation of a downstream and a plurality of upstream conveyor zones to maintain stationary any loads supported by the conveyor zones; and
   automatically re-starting the conveyor zones by sequentially initiating operation of the downstream conveyor zone and the upstream conveyor zones by first initiating operation of the downstream conveyor zone, and subsequently sequentially controlling initiation of operation of each upstream conveyor zone, wherein the re-starting step is carried out by:
   counting a number of motor revolutions of a drive motor associated with the downstream conveyor zone; then
   automatically initiating operation of an adjacent first upstream conveyor zone when the downstream drive motor revolution count reaches a predefined level;
   counting a number of motor revolutions of a drive motor associated with the first upstream conveyor zone; then
   automatically initiating operation of a second upstream conveyor zone adjacent to the first upstream conveyor zone when the drive motor revolution count of the first conveyor zone reaches a predefined level,
   wherein operation of each conveyor zone is initiated in a controlled sequential manner in response to when the drive motor of a conveyor zone downstream thereof reaches a predefined revolution count during start-up.

* * * * *